United States Patent
Wander

(10) Patent No.: US 8,255,097 B1
(45) Date of Patent: Aug. 28, 2012

(54) SYSTEM AND METHOD FOR MANAGING MAINTENANCE ACTIVITIES

(75) Inventor: Kyle Edward Wander, Tulsa, OK (US)

(73) Assignee: American Airlines, Inc., Fort Worth, TX (US)

( * ) Notice: Subject to any disclaimer, the term of this patent is extended or adjusted under 35 U.S.C. 154(b) by 728 days.

(21) Appl. No.: 12/475,092

(22) Filed: May 29, 2009

(51) Int. Cl.
*G06F 17/00* (2006.01)

(52) U.S. Cl. ............... 701/3; 701/1; 701/34.3; 701/120; 701/438; 701/485; 340/995.24; 340/988; 340/989; 340/990; 340/991

(58) Field of Classification Search .................. 701/1, 3, 701/34.3, 34.4, 14, 120, 426, 438, 485; 340/905, 340/936, 995.24, 988, 989, 990, 991
See application file for complete search history.

(56) References Cited

U.S. PATENT DOCUMENTS

| | | | |
|---|---|---|---|
| 3,706,969 A * | 12/1972 | Paredes ........................ | 340/989 |
| 5,948,040 A | 9/1999 | DeLorme et al. | |
| 5,952,941 A | 9/1999 | Mardirossian | |
| 6,195,609 B1 * | 2/2001 | Pilley et al. ................... | 701/120 |
| 6,453,237 B1 * | 9/2002 | Fuchs et al. ................... | 701/485 |
| 6,526,335 B1 | 2/2003 | Treyz et al. | |
| 6,711,474 B1 | 3/2004 | Treyz et al. | |
| 6,728,612 B1 * | 4/2004 | Carver et al. ................ | 701/34.3 |
| 6,992,626 B2 * | 1/2006 | Smith ........................... | 342/454 |
| 7,069,121 B1 * | 6/2006 | Cummings et al. ............... | 701/3 |
| 7,561,037 B1 * | 7/2009 | Monroe ......................... | 340/521 |
| 7,747,382 B2 * | 6/2010 | Small et al. ................... | 701/120 |
| 7,813,871 B2 * | 10/2010 | Small et al. ................... | 701/120 |
| 2002/0045976 A1 * | 4/2002 | Kodama .......................... | 701/29 |
| 2003/0083804 A1 * | 5/2003 | Pilley et al. ................... | 701/120 |
| 2005/0187677 A1 * | 8/2005 | Walker ............................ | 701/16 |
| 2006/0004496 A1 * | 1/2006 | Tucker et al. ..................... | 701/4 |
| 2006/0294140 A1 | 12/2006 | Schemionek et al. | |

OTHER PUBLICATIONS

Richard M. Camby, "Notice of Allowance," Mar. 1, 2006, in U.S. Appl. No. 11/198,616, U.S. Patent and Trademark Office.

* cited by examiner

*Primary Examiner* — Khoi Tran
*Assistant Examiner* — Jonathan L Sample
(74) *Attorney, Agent, or Firm* — Haynes and Boone, LLP

(57) ABSTRACT

A system and method for managing maintenance activities such as, for example, aircraft maintenance activities, according to which, in several exemplary embodiments, aircraft maintenance requirements are monitored and/or aircraft maintenance resources are assigned.

22 Claims, 13 Drawing Sheets

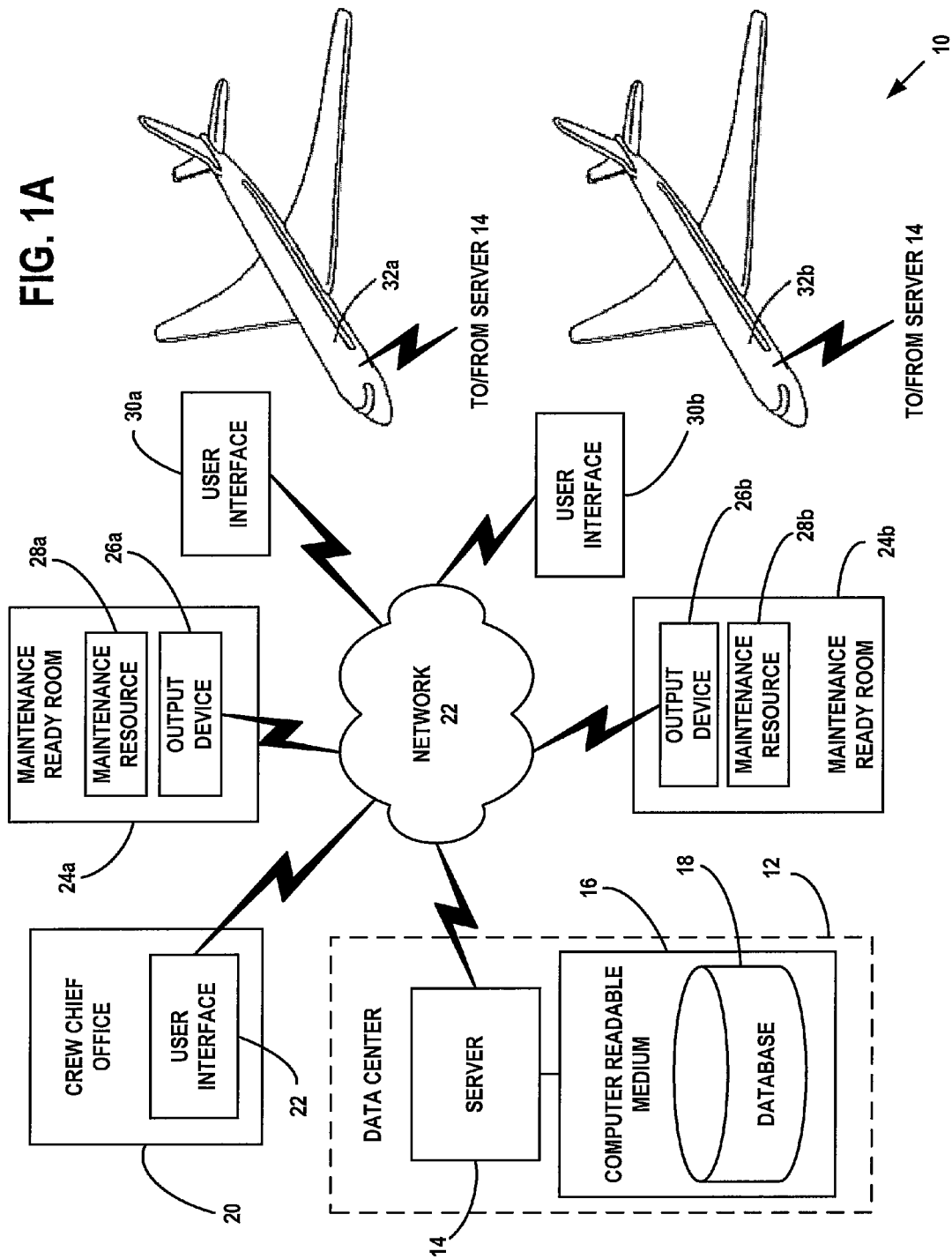

| ARRIVAL INFORMATION | | | | | | MANNING ASSIGNMENT | |
|---|---|---|---|---|---|---|---|
| AIRCRAFT | FLIGHT | DEPARTURE LOCATION | ARRIVAL GATE | SCHEDULED TIME OF ARRIVAL | ACTUAL TIME OF ARRIVAL | STATUS | RESOURCES | COMMENTS |
| 077 | 0960 | PTY | E30 | 1125 | 1225 | ETA | SMITH | |
| 058 | 1700 | SJO | E31 | 1145 | 1134 | ETA | JONES | |

FIG. 6

SYSTEM AND METHOD FOR MANAGING MAINTENANCE ACTIVITIES

BACKGROUND

The present disclosure relates in general to maintenance activities, and in particular to a system and method for managing maintenance activities such as, for example, aircraft maintenance activities including, for example, monitoring aircraft maintenance requirements and/or assigning aircraft maintenance resources.

BRIEF DESCRIPTION OF THE DRAWINGS

FIGS. 1A and 1B are diagrammatic illustrations of a system according to an exemplary embodiment, the system including a plurality of user interfaces.

FIG. 6 is a diagrammatic illustration of a portion of output generated during the method of FIG. 3, according to an exemplary embodiment.

DETAILED DESCRIPTION

Figure 1B:
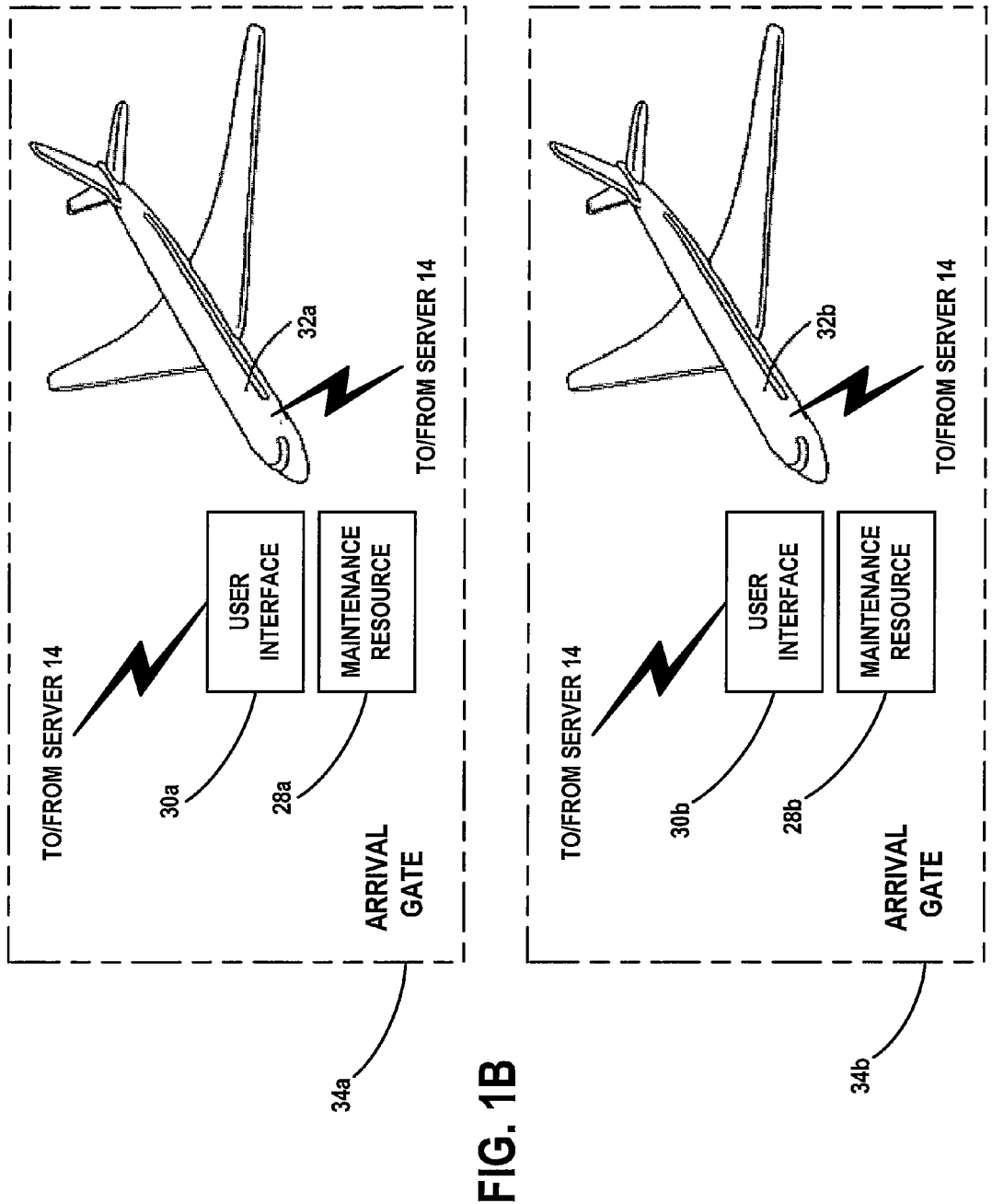

In an exemplary embodiment, as illustrated in FIGS. 1A and 1B, a system is generally referred to by the reference numeral 10 and includes a data center 12 including a server 14 and a computer readable medium 16 operably coupled thereto. Instructions accessible to, and executable by, the server 14 are stored in the computer readable medium 16. A database 18 is also stored in the computer readable medium 16. The system 10 further includes a crew chief office 20, at which a user interface 22 is located, and line maintenance ready rooms 24a and 24b, at which output devices 26a and 26b, respectively, are located. The user interface 22 is operably coupled to, and in two-way communication with, the server 14 via a network 22, and the output devices 26a and 26b are operably coupled to the server 14 via the network 22.

The output devices 26a and 26b include relatively large LCD monitors permanently or semi-permanently positioned in the maintenance ready rooms 24a and 24b, respectively, which monitors are operably coupled to respective computers (not shown), which computers are operably coupled to the server 14. In several exemplary embodiments, instead of, or in addition to an LCD monitor, each of the output devices 26a and 26b includes a printer, a plotter, one or more other graphical displays, and/or any combination thereof.

Maintenance resources 28a and 28b are adapted to be located at the maintenance ready rooms 24a and 24b, respectively, under conditions to be described below. Each of the maintenance resources 28a and 28b is an aircraft maintenance technician (AMT). In several exemplary embodiments, instead of, or in addition to an AMT, each of the maintenance resources 28a and 28b is or includes maintenance tools or equipment, maintenance vehicles, diagnostic equipment, mechanical tools, replacement parts, replacement components or assemblies, one or more other AMTs, and/or any combination thereof. However, for the purpose of clarity, the maintenance resources 28a and 28b will hereinafter be referred to as AMTs 28a and 28b, respectively.

User interfaces 30a and 30b are operably coupled to, and in two-way communication with, the server 14 via the network 22. Aircraft, such as airplanes 32a and 32b, are operably coupled to, and in two-way communication with, the server 14 via the network 22. In an exemplary embodiment, each of the airplanes 32a and 32b is in two-way communication with the server 14 of the data center 12 via the network 22, with the network 22 including an aircraft communication addressing and reporting system (ACARS).

As shown in FIG. 1B, the system 10 further includes an airline arrival gate 34a at which the maintenance resource 28a, the user interface 30a, and the airplane 32a are adapted to arrive at and/or otherwise be located, under conditions to be described below, and an airline arrival gate 34b at which the maintenance resource 28b, the user interface 30b, and the airplane 32b are adapted to arrive at and/or otherwise be located, under conditions to be described below. The arrival gates 34a and 34b are part of an airport or station (not shown), at which the airplanes 32a and 32b arrive and from which the airplanes 32a and 32b depart.

In an exemplary embodiment, the server 14 is a web application server. In an exemplary embodiment, the data center 12 is, includes, or is at least a part of, a web-based program, an Intranet-based program, and/or any combination thereof. In an exemplary embodiment, the data center 12 and/or one or more components thereof, the computer readable medium 16 and/or content stored therein, the database 18 and/or content stored therein, and/or any combination thereof, are part of, and/or are distributed throughout, the system 10 and/or one or more of the components thereof, including, for example, one or more of the user interfaces 22, 30a and 30b, one or more of the output devices 26a and 26b, and/or one or more of the airplanes 32a and 32b. In an exemplary embodiment, the network 22 includes the Internet, one or more local area networks, one or more wide area networks, one or more cellular networks, one or more wireless networks, one or more voice networks, one or more data networks, one or more communication systems, and/or any combination thereof. In several exemplary embodiments, the respective quantities of one or more of the components and/or parts of the system 10, such as, for example, the respective quantities of the data center 12, the server 14, the computer readable medium 16, the database 18, the crew chief office 20, the user interfaces 22, 30a and 30b, the ready rooms 24a and 24b, the output devices 26a and 26b, the AMTs 28a and 28b, the airplanes 32*a* and 32*b*, and the arrival gates 34*a* and 34*b*, are increased, decreased or otherwise varied.

Figure 2:
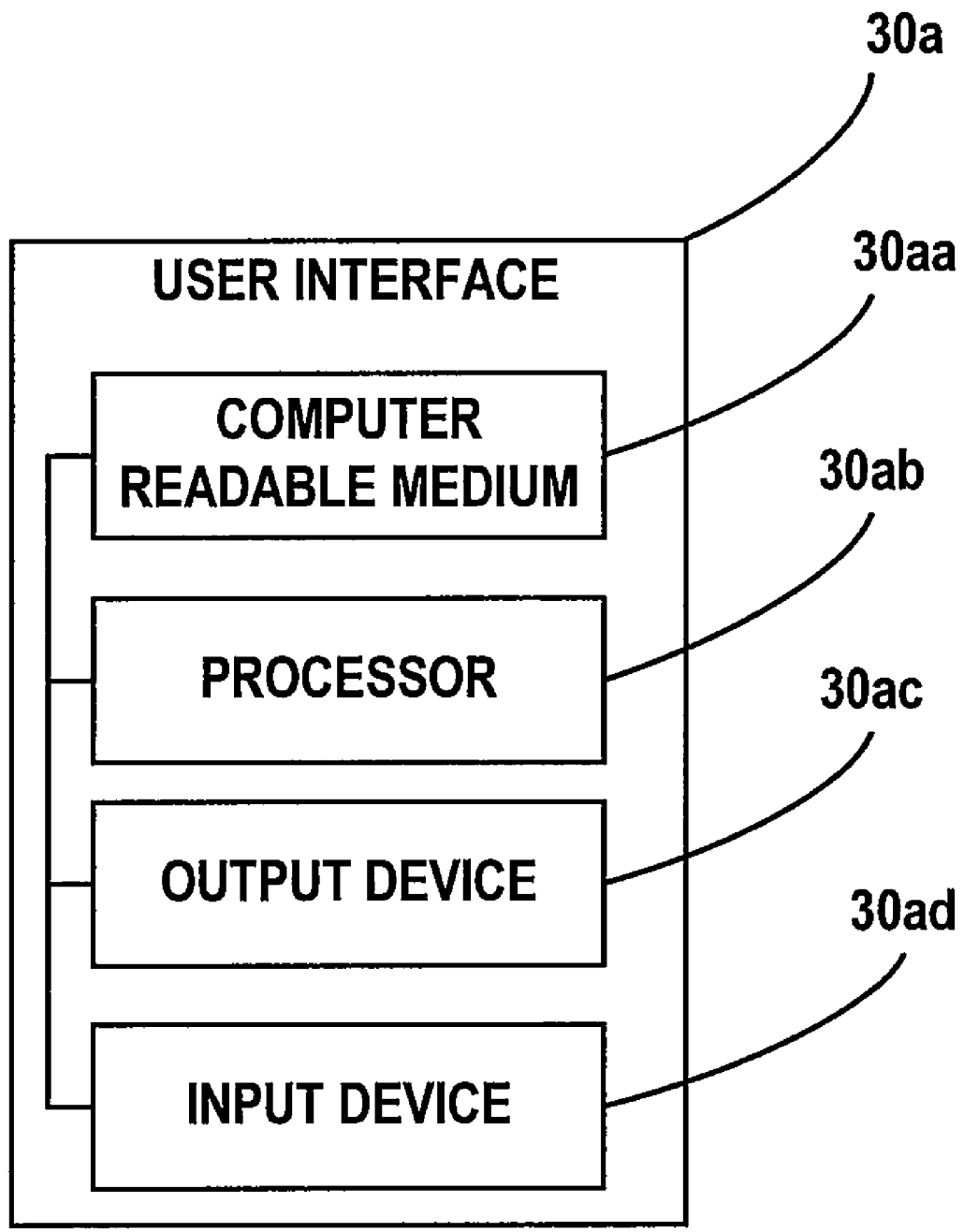
FIG. 2 is a diagrammatic illustration of one of the user interfaces of FIGS. 1A and 1B, according to an exemplary embodiment.

In an exemplary embodiment, as illustrated in FIG. 2 with continuing reference to FIGS. 1A and 1B, the user interface 30*a* includes a computer readable medium 30*aa*, a processor 30*ab*, an output device 30*ac*, and an input device 30*ad*. In an exemplary embodiment, instructions accessible to, and executable by, the processor 30*ab* are stored in the computer readable medium 30*aa*. In an exemplary embodiment, web browser software is stored in the computer readable medium 30*aa*. In an exemplary embodiment, the output device 30*ac* includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 30*ac* includes a graphical display, a printer, a plotter, and/or any combination thereof. In an exemplary embodiment, the input device 30*ad* includes a touch screen, which, in several exemplary embodiments, is, includes, or is at least a part of, the output device 30*ac*. In an exemplary embodiment, instead of, or in addition to a touch screen, the input device 30*ad* includes one or more keyboards, one or more PIN pads, one or more scanners, one or more card readers, and/or any combination thereof.

In an exemplary embodiment, the user interface 30*a* is a handheld or otherwise mobile or portable computing device which is carried by, or moves with, the AMT 28*a*, under conditions to be described below. In an exemplary embodiment, the user interface 30*a* is mounted to a vehicle on which the AMT 28*a* is adapted to travel between different locations in the system 10 including, for example, one or more of the crew chief office 20, the maintenance ready rooms 24*a* and 24*b*, and the arrival gates 34*a* and 34*b*; in an exemplary embodiment, the vehicle is used for maintenance purposes, under conditions to be described below.

In an exemplary embodiment, the user interface 30*a* is, includes, or is at least a part of, the data center 12, the server 14, the computer readable medium 16, the database 18, and/or any combination thereof. In several exemplary embodiments, the user interface 30*a* is a thin client and the server 14 controls at least a portion of the operation of the user interface 30*a*. In several exemplary embodiments, the user interface 30*a* is a thick client. In several exemplary embodiments, the user interface 30*a* functions as both a thin client and a thick client. In several exemplary embodiments, the user interface 30*a* is, or includes, a telephone, a personal computer, a portable computer, a personal digital assistant, a cellular telephone, other types of telecommunications devices, other types of computing devices, and/or any combination thereof. In several exemplary embodiments, the user interface 30*a* includes a plurality of user interfaces. In several exemplary embodiments, the user interface 30*a* is, or at least includes, the data center 12.

In an exemplary embodiment, the user interface 30*b* is substantially identical to the user interface 30*a* and therefore will not be described in detail. Reference numerals used to refer to the components of the user interface 30*b* that are substantially identical to the components of the user interface 30*a* will correspond to the reference numerals used to refer to the components of the user interface 30*a*, except that the prefix for the reference numerals used to the describe the user interface 30*a*, that is, 30*a*, will be replaced by the prefix of the user interface 30*b*, that is, 30*b*.

In an exemplary embodiment, the user interface 22 is substantially identical to the user interface 30*a* except that the user interface 22 is a standard desktop computer permanently or semi-permanently positioned in the crew chief office 20. In an exemplary embodiment, the user interface 22 is a portable computer substantially identical to the user interface 30*a*. Reference numerals used to refer to the components of the user interface 22 that are substantially identical to the components of the user interface 30*a* will correspond to the reference numerals used to refer to the components of the user interface 30*a*, except that the prefix for the reference numerals used to the describe the user interface 30*a*, that is, 30*a*, will be replaced by the prefix of the user interface 22, that is, 22.

In several exemplary embodiments, the platforms of the server 14, the user interfaces 22, 30*a* and 30*b*, and any computing devices to which the output devices 26*a* and 26*b* are operably coupled, are identical, different, or vary with respect to equipment, peripherals, hardware architecture and/or specifications, software architecture and/or specifications, and/or any combination thereof.

Figure 3:
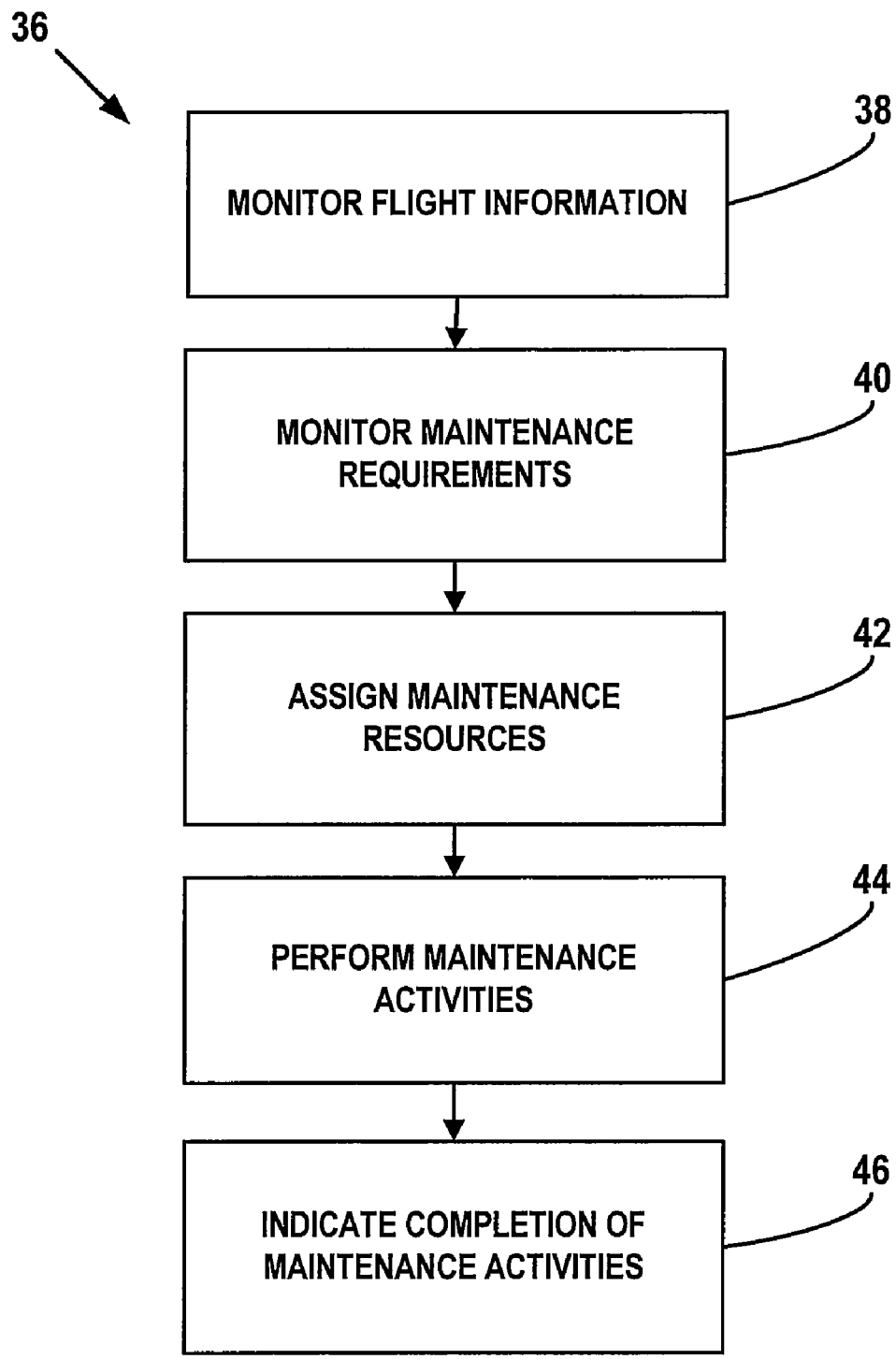
FIG. 3 is a flow chart illustration of a method of operating the system of FIGS. 1A and 1B, according to an exemplary embodiment.

In an exemplary embodiment, as illustrated in FIG. 3 with continuing reference to FIGS. 1A, 1B and 2, a method of operating the system 10 is generally referred to by the reference numeral 36 and, in several exemplary embodiments, the method 36 is implemented by, or at least partially implemented by, the data center 12, the user interface 22, the user interfaces 30*a* and 30*b*, and/or any combination thereof. As shown in FIG. 3, the method 36 includes monitoring flight information in step 38, monitoring maintenance requirements in step 40, assigning maintenance resources in step 42, performing maintenance activities in step 44, and indicating completion of maintenance activities in step 46. In several exemplary embodiments, each one of the steps 38, 40, 42, 44 and 46 is executed before, during and/or after one or more other of the steps 38, 40, 42, 44 and 46; in several exemplary embodiments, the steps 38, 40, 42, 44 and 46 are executed simultaneously, sequentially, and/or any combination thereof.

Figure 4:
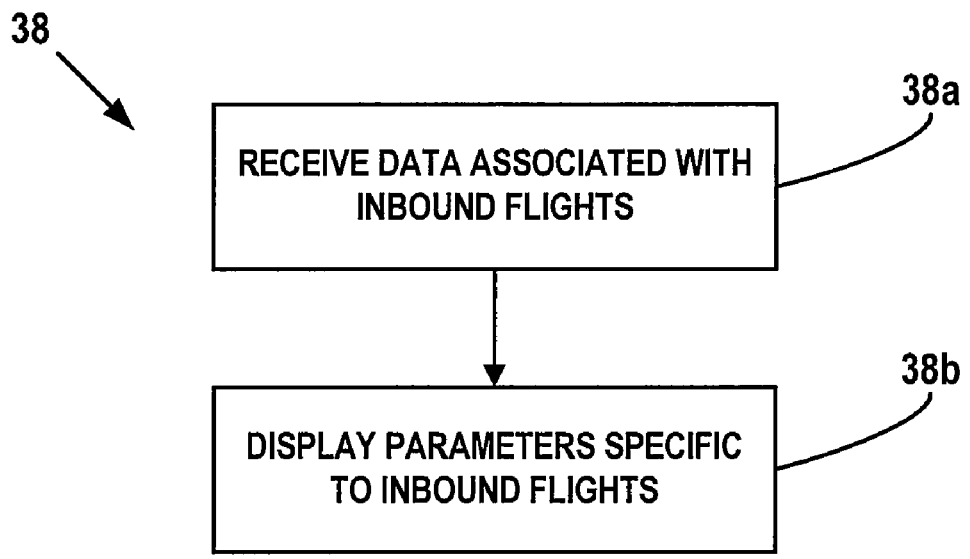
FIG. 4 is a flow chart illustration of a step of the method of FIG. 3, according to an exemplary embodiment.

In an exemplary embodiment, as illustrated in FIG. 4 with continuing reference to FIGS. 1A, 1B, 2 and 3, to monitor flight information in the step 38, data associated with inbound flights is received in step 38*a*, the inbound flights using the airplanes 32*a* and 32*b*, respectively, and, in response to the step 38*a*, parameters specific to the inbound flights are automatically displayed in step 38*b*.

Figure 5:
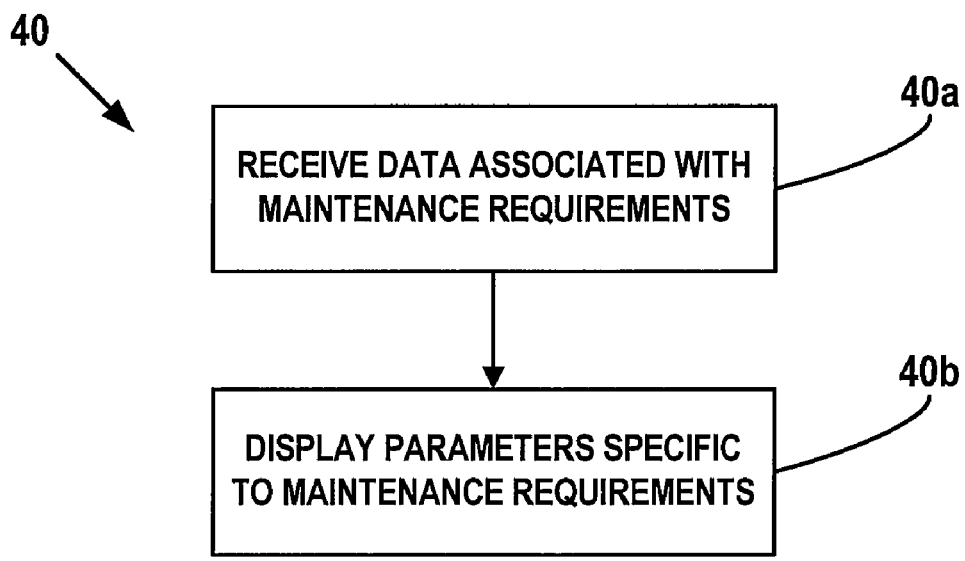
FIG. 5 is a flow chart illustration of another step of the method of FIG. 3, according to an exemplary embodiment.

In an exemplary embodiment, as illustrated in FIG. 5 with continuing reference to FIGS. 1A, 1B, 2, 3 and 4, to monitor maintenance requirements in the step 40, data associated with the maintenance requirements of the airplanes 32*a* and 32*b* is received in step 40*a* and, in response, parameters specific to the maintenance requirements are displayed in step 40*b*.

In an exemplary embodiment, to receive data associated with the inbound flights using the airplanes 32*a* and 32*b* in the step 38*a*, a program such as, for example, a web browser, is executed by the processor 22*b* of the user interface 22 at the location of the crew chief office 20, thereby causing the web browser to access a website hosted by the server 14, which website provides access to one or more programs and data stored in one or more of the computer readable medium 16 and the database 18, with the accessed data stored in the one or more of the computer readable medium 16 and the database 18 having been received from one or more of the following data sources: one or more of the airplanes 32*a* and 32*b*; one or more of the user interfaces 30*a* and 30*b*; a dispatch environmental control system (DECS) (not shown) and/or one or more computer systems, host-based systems and/or applications thereof; an enhanced reservation system (RES) (not shown) and/or one or more computer systems, host-based systems and/or applications thereof; the Federal Aviation Administration (FAA) (not shown) and/or one or more computer systems, host-based systems and/or applications thereof; off-schedule operations (OSO) (not shown) and/or one or more computer systems, host-based systems and/or applications thereof; a flight operating system (FOS) (not shown) and/or one or more computer systems, host-based systems and/or applications thereof; and an aircraft communication addressing and reporting system (ACARS) (not shown) and/or one or more computer systems, host-based systems and/or applications thereof. In an exemplary embodiment, to receive data in the step 38*a*, data is accessed from the data center 12, but at least a portion of the accessed data is not stored in the data center 12, with the server 14 instead accessing the at least a portion of the data from one or more of the data sources noted above.

In an exemplary embodiment, during the execution of the method 36, the data received in the step 38*a* is continually and automatically updated, continually and automatically updated at predetermined time intervals, and/or any combination thereof, thereby ensuring that the data received in the step 38*a* remains current and accurate. In an exemplary embodiment, the step 38*a* further includes refreshing the received data with recent updates of the data from the data center 12 and/or the aforementioned one or more data sources, issuing one or more queries for updated data from the data center 12 and/or the aforementioned one or more data sources, issuing one or more queries for updated data from the data center 12 and/or the aforementioned one or more data sources at predetermined time intervals, issuing one or more queries for all of the data previously received in the step 38*a*, issuing one or more queries for all of the data previously received in the step 38*a* at predetermined time intervals, and/or any combination thereof.

In an exemplary embodiment, to receive data associated with the inbound flights using the airplanes 32*a* and 32*b* in the step 38*a*, a crew chief, who is responsible for managing the maintenance activities carried out by the AMTs 28*a* and 28*b*, employs the user interface 22 in the location of the crew chief office 20 to access the data associated with the inbound flights, in accordance with the foregoing.

In an exemplary embodiment, as illustrated in FIG. 6 with continuing reference to FIGS. 1A, 1B, 2, 3, 4 and 5, to display data specific to the inbound flights using the airplanes 32*a* and 32*b* in the step 38*b*, a plurality 48 of rows of parameters is automatically displayed on the output device 22*c* of the user interface 22 at the location of the crew chief office 20, with each row of parameters in the plurality 48 including identifiers and indicators specific to an inbound flight, the inbound flight using either the airplane 32*a* or the airplane 32*b*; more particularly, each of the rows of parameters in the plurality 48 includes an inbound flight identifier 50 such as, for example, a flight number, associated with the inbound flight, an arrival gate identifier 52 associated with the arrival gate of the inbound flight, a scheduled time of arrival indicator 54 associated with the scheduled time of arrival of the inbound flight, an aircraft identifier 56 associated with the aircraft (either airplane 32*a* or 32*b*) employed by the inbound flight, and an actual time of arrival indicator 58 associated with the actual time of arrival of the inbound flight. The plurality 48 of rows is automatically displayed in response to receiving the data in the step 38*a*. In several exemplary embodiments, if the number of inbound flights (and thus airplanes) for which information is being monitored in the step 38 is increased or decreased, the number of rows in the plurality 48 of rows displayed on the output device 22*c* is correspondingly increased or decreased.

Figure 7:
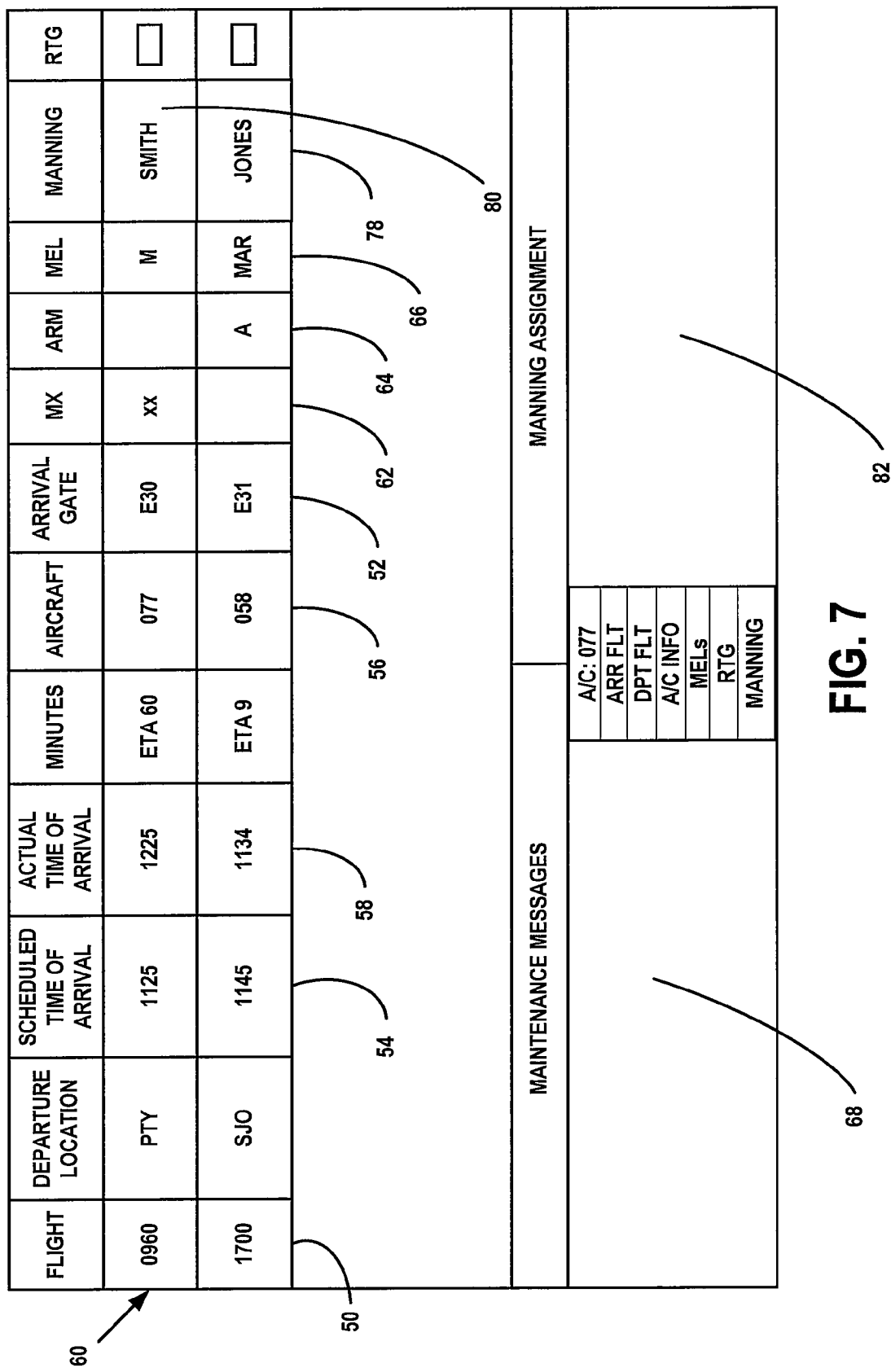
FIG. 7 is a diagrammatic illustration of another portion of output generated during the method of FIG. 3, according to an exemplary embodiment.

In an exemplary embodiment, as illustrated in FIG. 7 with continuing reference to FIGS. 1A, 1B, 2, 3, 4, 5 and 6, to display data specific to the inbound flights using the airplanes 32*a* and 32*b* in the step 38*b*, instead of, or in addition to displaying the plurality 48 of rows of parameters on the output device 22*c* of the user interface 22 at the location of the crew chief office 20, a plurality 60 of rows of parameters is automatically displayed on the output device 22*c* of the user interface 22 at the location of the crew chief office 20, with each of the rows of parameters in the plurality 60 including the inbound flight identifier 50 associated with the inbound flight, the arrival gate identifier 52 associated with the arrival gate of the inbound flight, the scheduled time of arrival indicator 54 associated with the scheduled time of arrival of the inbound flight, the aircraft identifier 56 associated with the aircraft (either airplane 32*a* or 32*b*) employed by the inbound flight, and the actual time of arrival indicator 58 associated with the actual time of arrival of the inbound flight. The plurality 60 of rows is automatically displayed in response to receiving the data in the step 38*a*. In several exemplary embodiments, if the number of inbound flights (and thus airplanes) for which information is being monitored in the step 38 is increased or decreased, the number of rows in the plurality 60 of rows displayed on the output device 22*c* is correspondingly increased or decreased.

As a result of the display of the plurality 48 of rows of parameters on the output device 22*c* at the location of the crew chief office 20, and/or the display of the plurality 60 of rows of parameters on the output device 22*c* at the location of the crew chief office 20, the inbound flight information is able to be monitored by the crew chief, who is responsible for managing the maintenance activities carried out by the AMTs 28*a* and 28*b*.

In addition to displaying the pluralities 48 and/or 60 of rows of parameters on the output device 22*c* of the user interface 22 at the location of the crew chief office 20, the pluralities 48 and/or 60 are also automatically displayed on each of the output devices 26*a* and 26*b*, respectively, at the locations of the maintenance ready rooms 24*a* and 24*b*, respectively. As a result of the display of the pluralities 48*a* and/or 60 on the output device 26*a*, the inbound flight information is able to be monitored by the AMT 28*a* when the AMT 28*a* is positioned in the maintenance ready room 24*a*. As a result of the display of the pluralities 48 and/or 60 on the output device 26*b*, the inbound flight information is able to be monitored by the AMT 28*b* when the AMT 28*b* is positioned in the maintenance ready room 24*b*. In an exemplary embodiment, both of the AMTs 28*a* and 28*b* are located in the maintenance ready room 24*a* or 24*b*, from which the AMTs 28*a* and 28*b* are able to monitor the inbound flight information.

In an exemplary embodiment, to receive data associated with the maintenance requirements of the airplanes 32*a* and 32*b* employed by the respective inbound flights in the step 40*a*, a program such as, for example, a web browser, is executed by the processor 22*b* of the user interface 22 at the location of the crew chief office 20, thereby causing the web browser to access a website hosted by the server 14, which website provides access to one or more programs and data stored in one or more of the computer readable medium 16 and the database 18, with the accessed data stored in the one or more of the computer readable medium 16 and the database 18 having been received from one or more of the following data sources: one or more of the airplanes 32*a* and 32*b*; one or more of the user interfaces 30*a* and 30*b*; a dispatch environmental control system (DECS) (not shown) and/or one or more computer systems, host-based systems and/or applications thereof; an enhanced reservation system (RES) (not shown) and/or one or more computer systems, host-based systems and/or applications thereof; the Federal Aviation Administration (FAA) (not shown) and/or one or more computer systems, host-based systems and/or applications thereof; off-schedule operations (OSO) (not shown) and/or one or more computer systems, host-based systems and/or applications thereof; a flight operating system (FOS) (not shown) and/or one or more computer systems, host-based systems and/or applications thereof; and an aircraft communication addressing and reporting system (ACARS) (not shown) and/or one or more computer systems, host-based systems and/or applications thereof. In an exemplary embodiment, to receive data in the step 40*a*, data is accessed from the data center 12, but at least a portion of the accessed data is not stored in the data center 12, with the server 14 instead accessing the at least a portion of the data from one or more of the data sources noted above.

In an exemplary embodiment, during the execution of the method 36, the data received in the step 40*a* is continually and automatically updated, continually and automatically updated at predetermined time intervals, and/or any combination thereof, thereby ensuring that the data received in the step 40*a* remains current and accurate. In an exemplary embodiment, the step 40*a* further includes refreshing the received data with recent updates of the data from the data center 12 and/or the aforementioned one or more data sources, issuing one or more queries for updated data from the data center 12 and/or the aforementioned one or more data sources, issuing one or more queries for updated data from the data center 12 and/or the aforementioned one or more data sources at predetermined time intervals, issuing one or more queries for all of the data previously received in the step 40*a*, issuing one or more queries for all of the data previously received in the step 40*a* at predetermined time intervals, and/or any combination thereof.

In an exemplary embodiment, to receive data associated with the maintenance requirements of the airplanes 32*a* and 32*b* employed by the respective inbound flights in the step 40*a*, the crew chief, who is responsible for managing the maintenance activities carried out by the AMTS 28*a* and 28*b*, employs the user interface 22 in the location of the crew chief office 20 to access the data associated with the maintenance requirements, in accordance with the foregoing.

In an exemplary embodiment, as illustrated in FIG. 7 with continuing reference to FIGS. 1A, 1B, 2, 3, 4, 5 and 6, to display parameters specific to the maintenance requirements of the airplanes 32*a* and 32*b* employed by the respective inbound flights in the step 40*b*, maintenance indicators associated with respective maintenance requirements of the airplanes 32*a* and 32*b* are automatically displayed in the plurality 60 of rows of parameters, which is displayed on the output device 22*c* of the user interface 22 at the location of the crew chief office 20, with each of the rows of parameters in the plurality 60 including maintenance indicators 62, 64 and 66. The maintenance indicator 62 is associated with a maintenance requirement setting forth the type of maintenance that needs to be done to the aircraft at some point in time, either at the arrival gate (34*a* or 34*b*) if time permits or at a future time. For example, the maintenance indicator 62 can include the symbol "xx," which indicates that a type of maintenance needs to be done to the airplane 32*a* or 32*b* at some point in time, either at the arrival gate if time permits or at a future time. The maintenance indicator 64 is associated with an aircraft malfunction report (ARM), which indicates the type of maintenance check that needs to be performed on the airplane 32*a* or 32*b*. For example, the maintenance indicator 64 can include the symbol "A" indicating an A-type maintenance check at the arrival gate (34*a* or 34*b*), the symbol "B" indicating a B-type maintenance check, or the symbol "C" indicating a C-type maintenance check at a maintenance base. The maintenance indicator 66 is associated with a minimum equipment list (MEL) indicating details of the maintenance requirements of the airplane 32*a* or 32*b*. For example, the maintenance indicator 66 can include the symbol "MAR" indicating that one or more maintenance actions are required, or the symbol "M" indicating that maintenance on equipment for which operational deviation is permitted may be performed. A parameter or maintenance indicator 68 is also displayed on the output device 22*c* and, as shown in FIG. 7, the indicator 68 may be positioned below the plurality 60 of rows of parameters. The indicator 68 includes one or more maintenance messages, which can, for example, correspond to, expound on, and/or provide additional details regarding, one or more of the maintenance indicators 62, 64 and 66.

As a result of the display of the maintenance indicators 62, 64, 66 and 68 on the output device 22*c* at the location of the crew chief office 20, the maintenance requirements of the airplanes 32*a* and 32*b* are able to be monitored by the crew chief, who is responsible for managing the maintenance activities carried out by the AMTs 28*a* and 28*b*.

In addition to displaying the maintenance indicators 62, 64, 66 and 68 on the output device 22*c* of the user interface 22 at the location of the crew chief office 20, the maintenance indicators 62, 64, 66 and 68 are also automatically displayed on each of the output devices 26*a* and 26*b*, respectively, at the locations of the maintenance ready rooms 24*a* and 24*b*, respectively. That is, the output or display illustrated in FIG. 7 is simultaneously or nearly simultaneously displayed on each of the output devices 22*c*, 26*a* and 26*b*. As a result of the display of the maintenance indicators 62, 64, 66 and 68 on the output device 26*a*, the maintenance requirements are able to be monitored by the AMT 28*a* when the AMT 28*a* is positioned in the maintenance ready room 24*a*. As a result of the display of the maintenance indicators 62, 64, 66 and 68 on the output device 26*b*, the maintenance requirements are also able to be monitored by the AMT 28*b* when the AMT 28*b* is positioned in the maintenance ready room 24*b*. In an exemplary embodiment, both of the AMTs 28*a* and 28*b* are located in the maintenance ready room 24*a* or 24*b*, from which the AMTs 28*a* and 28*b* are able to monitor the inbound flight information.

In an exemplary embodiment, as illustrated in FIG. 6 with continuing reference to FIGS. 1A, 1B, 2, 3, 4, 5 and 7, to assign maintenance resources in the step 42 of the method 36, the name and/or other identifier of one of the AMTs 28*a* and 28*b* is inputted into a field 70 with the input device 22*d* at the location of the crew chief office 20, and the name and/or other identifier of the other of the AMTs 28*a* and 28*b* is inputted into a field 72 with the input device 22*d* at the location of the crew chief 20, thereby assigning the respective AMTs 28*a* and 28*b* to the airplanes 32*a* and 32*b*. Comments regarding the respective assignments are inputted into respective fields 74 and 76 with the input device 22*d* at the location of the crew chief office 20. As shown in FIG. 6, the fields 70 and 74 are part of a row in the plurality 48 of rows of parameters, and the fields 72 and 76 are part of another row in the plurality 48 of rows of parameters. In an exemplary embodiment, at, for example, the beginning of a maintenance shift, the maintenance resources are initially assigned in the step 42 arbitrarily by, for example, inputting the names of the AMTs 28*a* and 28*b* in the fields 70 and 72 alphabetically or in a round-robin format.

As a result of the input of the names of the AMTs 28*a* and 28*b* in the fields 70 and 72 with the input device 22*d* of the user interface 22, the respective assignments of the AMTs 28*a* and 28*b* are automatically displayed in the plurality 48 of rows of parameters on the output device 22*c* at the location of the crew chief office 20. Moreover, as shown in FIG. 7, the respective assignments of the AMTs 28*a* and 28*b* are automatically displayed in the plurality 60 of rows of parameters by displaying respective assignment identifiers 78 and 80, which can include, in an exemplary embodiment, the names or and/or other identifiers inputted in the fields 70 and 72. The assignment identifiers 78 and 80 are automatically displayed in the each of the pluralities 48 and 60 on the output device 22*c* at the location of the crew chief office 20. An assignment identifier 82 is also automatically displayed on the output device 22*c* and, as shown in FIG. 7, the assignment identifier 82 may be positioned below the plurality 60 of rows of parameters. The assignment identifier 82 includes the comments inputted in one or more of the fields 74 and 76.

In addition to displaying the assignment identifiers 78, 80 and 82 on the output device 22*c* of the user interface 22 at the location of the crew chief office 20, the assignment identifiers 78, 80 and 82 are also automatically displayed on the output devices 26*a* and 26*b* at the locations of the maintenance ready rooms 24*a* and 24*b*, respectively. That is, the output or display illustrated in FIG. 7 is simultaneously or nearly simultaneously displayed on each of the output devices 22*c*, 26*a* and 26*b*. As a result of the display of the assignment identifiers 78, 80 and 82 on the output device 26*a*, the assignment of the AMT 28*a* to a specific aircraft such as the airplane 32*a* or 32*b* is able to be monitored by the AMT 28*a* when the AMT 28*a* is positioned in the maintenance ready room 24*a*. As a result of the display of the assignment identifiers 78, 80 and 82 on the output device 26*b*, the assignment of the AMT 28*b* to a specific aircraft such as the airplane 32*a* or 32*b* is able to be monitored by the AMT 28*b* when the AMT 28*b* is positioned in the maintenance ready room 24*b*. In an exemplary embodiment, both of the AMTs 28*a* and 28*b* are located in the maintenance ready room 24*a* or 24*b*, from which the AMTs 28*a* and 28*b* are able to monitor their maintenance assignments.

In several exemplary embodiments, the plurality 48 of rows of parameters is displayed on the output devices 22*c*, 26*a* and 26*b* in respective windows, and the plurality 60, the maintenance indicator 68 and the assignment identifier 82 are displayed on the output devices 22*c*, 26*a* and 26*b* in either the respective windows in which the plurality 48 is also displayed, or in respective windows that are different than the respective windows in which the plurality 48 is displayed.

Figure 8:
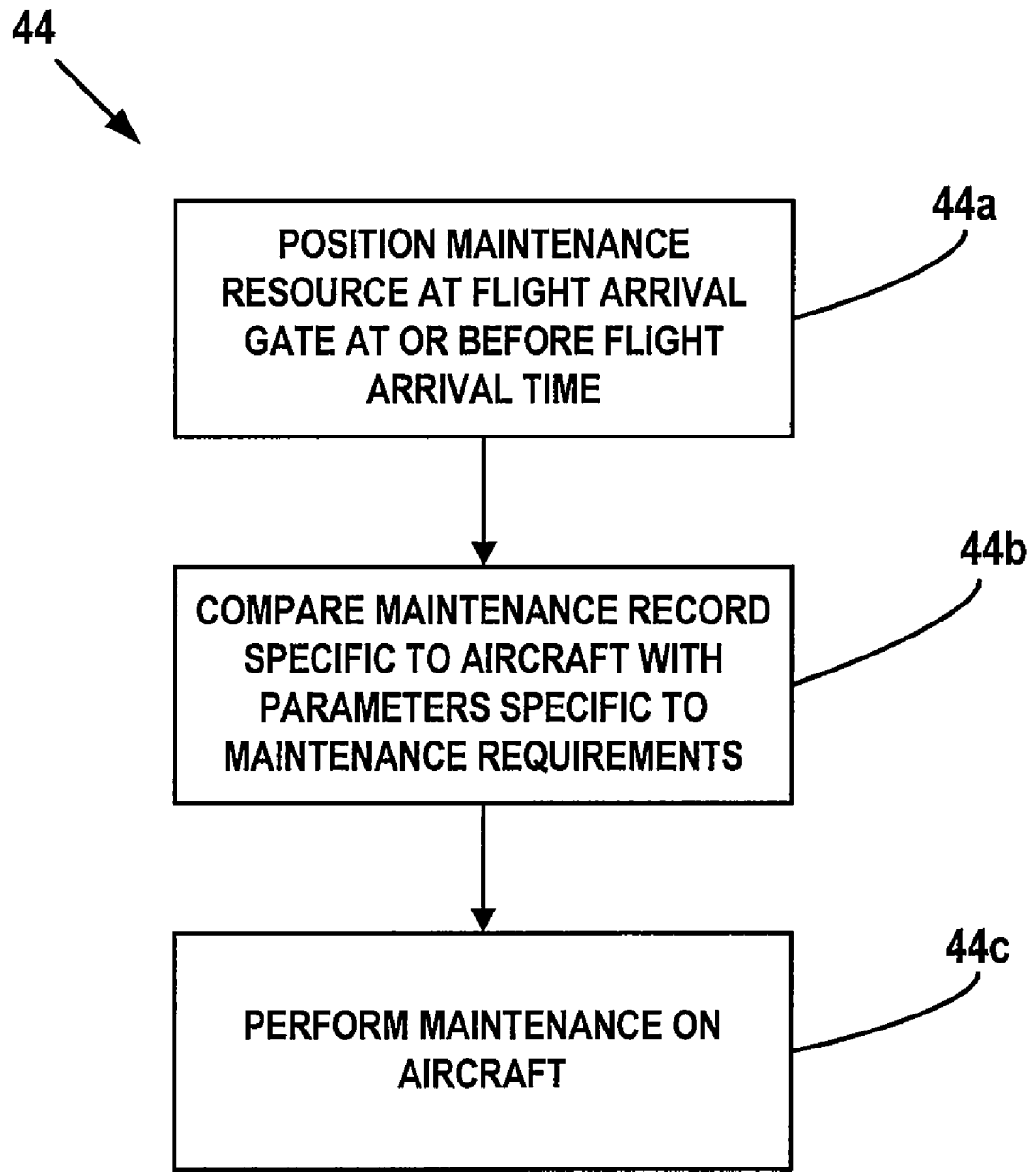
FIG. 8 is a flow chart illustration of yet another step of the method of FIG. 3, according to an exemplary embodiment.

In an exemplary embodiment, as illustrated in FIG. 8 with continuing reference to FIGS. 1A, 1B, 2, 3, 4, 5, 6 and 7, to perform maintenance activities in the step 44 of the method 36, the maintenance resources are positioned at the flight arrival gate at or before the time of arrival of the inbound flight in step 44*a*, a logbook or maintenance record specific to the aircraft employed by the inbound flight is compared with one or more of the maintenance indicators 62, 64, 66 and 68 in step 44*b*, and maintenance is performed on the aircraft in step 44*c*.

In an exemplary embodiment, during the step 44*a*, as a result of the AMT 28*a* monitoring the assignment identifiers 78, 80 and 82 on the output device 26*a* or 26*b*, the AMT 28*a* knows that he or she is assigned to a specific aircraft such as, for example, the airplane 32*a*, and therefore should arrive at the corresponding arrival gate such as, for example, the arrival gate 34*a*, at the same time as, or before, the arrival time of the airplane 32*a* at the arrival gate 34*a*, which, in several exemplary embodiments, may be the scheduled time of arrival as indicated by the indicator 54, the actual time of arrival as indicated by the indicator 58, or the earlier of the scheduled time of arrival and the actual time of arrival. As a result, the AMT 28*a* positions himself or herself at the gate 34*a* at the same time as, or before, the arrival time of the airplane 32*a*, as shown in FIG. 1B, thereby being ready to perform maintenance on the airplane 32*a* as soon as possible. Likewise, as a result of the AMT 28*b* monitoring the assignment identifiers 78, 80 and 82 on the output device 26*a* or 26*b*, the AMT 28*b* knows that he or she is assigned to a specific aircraft such as, for example, the airplane 32*b*, and therefore should arrive at the corresponding arrival gate such as, for example, the arrival gate 34*b*, at the same time as, or before, the arrival time of the airplane 32*b* at the arrival gate 34*b*, which, in several exemplary embodiments, may be the scheduled time of arrival as indicated by the indicator 54, the actual time of arrival as indicated by the indicator 58, or the earlier of the scheduled time of arrival and the actual time of arrival. As a result, the AMT 28*b* positions himself or herself at the gate 34*b* at the same time as, or before, the arrival time of the airplane 32*b*, as shown in FIG. 1B, thereby being ready to perform maintenance on the airplane 32*b* as soon as possible.

Before, during or after the step 44*a*, and as noted above, the respective logbooks or maintenance records specific to the airplanes 32*a* and 32*b* are compared with one or more of the respective maintenance indicators 62, 64, 66 and 68 in the step 44*b*, and maintenance is performed on the airplanes 32*a* and 32*b* in the step 44*c*. The maintenance performed in the step 44*c* is in accordance with one or more of the maintenance requirements associated with the maintenance indicators 62, 64, 66 and 68, and/or is not in accordance with one or more of the maintenance requirements associated with the maintenance indicators 62, 64, 66 and 68.

Figure 9:
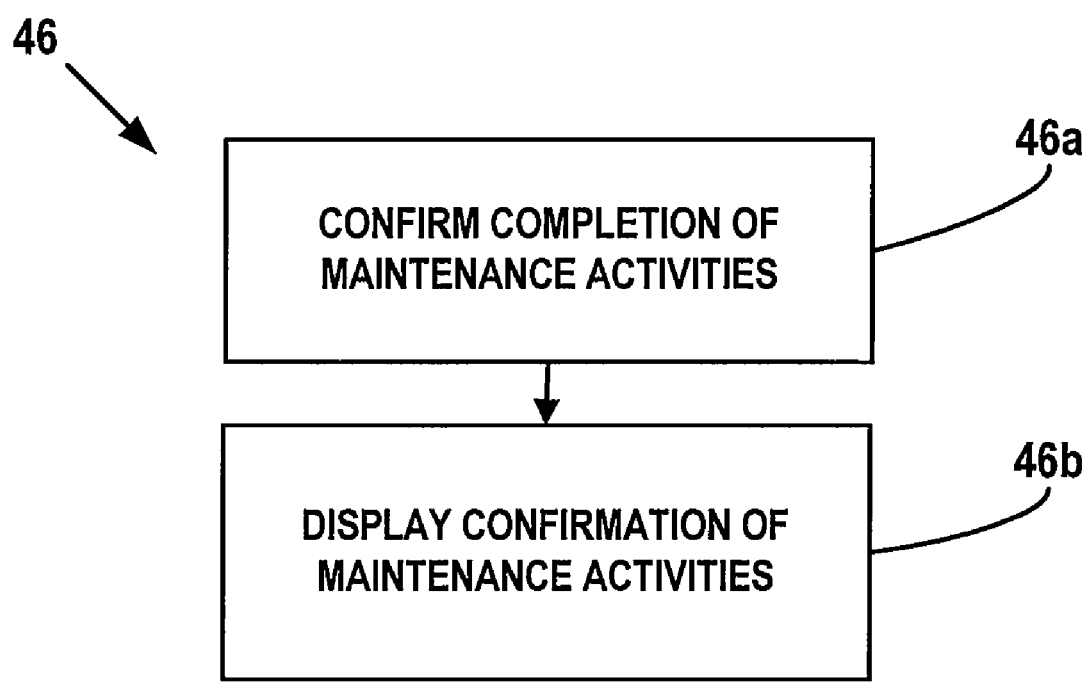
FIG. 9 is a flow chart illustration of still yet another step of the method of FIG. 3, according to an exemplary embodiment.

In an exemplary embodiment, as illustrated in FIG. 9 with continuing reference to FIGS. 1A, 1B, 2, 3, 4, 5, 6, 7 and 8, to indicate completion of the maintenance activities in the step 46 of the method 36, the completion of the maintenance activities is confirmed in step 46*a*, and the confirmation of the completion of the maintenance activities is displayed in step 46*b*.

Figure 10A:
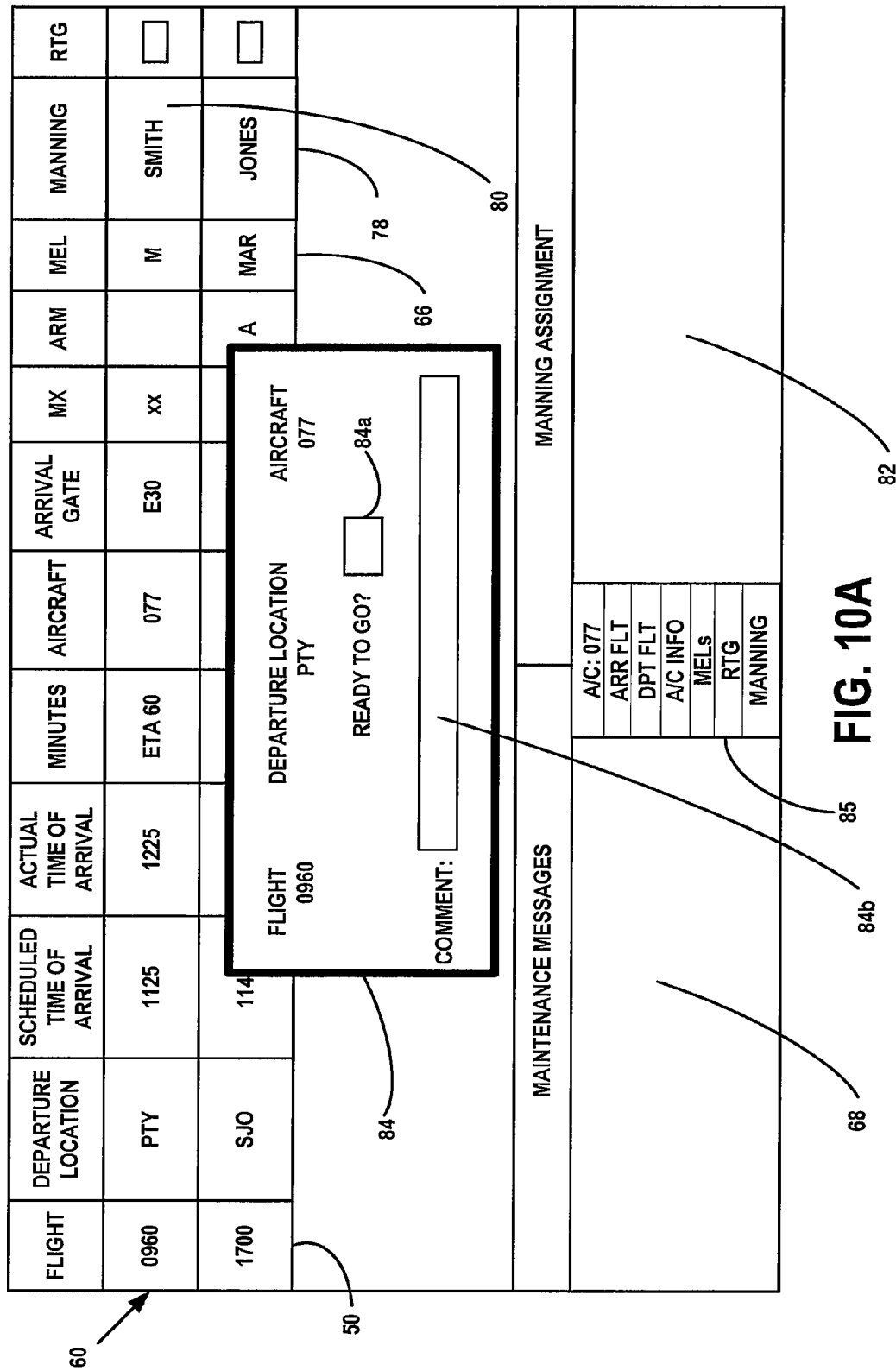
FIG. 10A is a diagrammatic illustration of yet another portion of output generated during the method of FIG. 3, according to an exemplary embodiment.

In an exemplary embodiment, as illustrated in FIG. 10A with continuing reference to FIGS. 1A, 1B, 2, 3, 4, 5, 6, 7 and 8, to confirm the completion of the maintenance activities in the step 46*a*, the AMT 28*a* or 28*b* opens a dialog box 84 on the output device 30*ac* or 30*bc* of the user interface 30*a* or 30*b* by, for example, clicking or otherwise selecting the header labeled RTG and displayed on the output device 30*ac* or 30*bc* as shown in FIG. 10A, clicking or otherwise selecting the row in the plurality 60 corresponding to the aircraft for which maintenance activities have been completed, or highlighting the row in the plurality 60 corresponding to the aircraft for which maintenance activities have been completed and then clicking or otherwise selecting an icon or button 85 labeled RTG. The dialog box 84 includes a check box 84*a* and a comment field 84*b*. The AMT 28*a* or 28*b* clicks or otherwise selects the check box 84*a* to thereby input or provide a completion identifier indicating the completion of the maintenance activities including, for example, that the airplane 32*a* or 32*b* has been met at the gate 34*a* or 34*b*, that the logbook or maintenance record of the airplane 32*a* or 32*b* has been reviewed, and that any open maintenance items have been addressed. The AMT 28*a* or 28*b* also enters in the comment field 84*b* any comments regarding the maintenance activities and/or the completion thereof. In several exemplary embodiments, instead of the AMT 28*a* or 28*b* inputting or providing a completion identifier in the foregoing manner, the AMT 28*a* or 28*b* communicates via, for example, a telephone or radio, with the crew chief or another person and the crew chief or the other person provides the completion identifier in the foregoing manner.

Figure 10B:
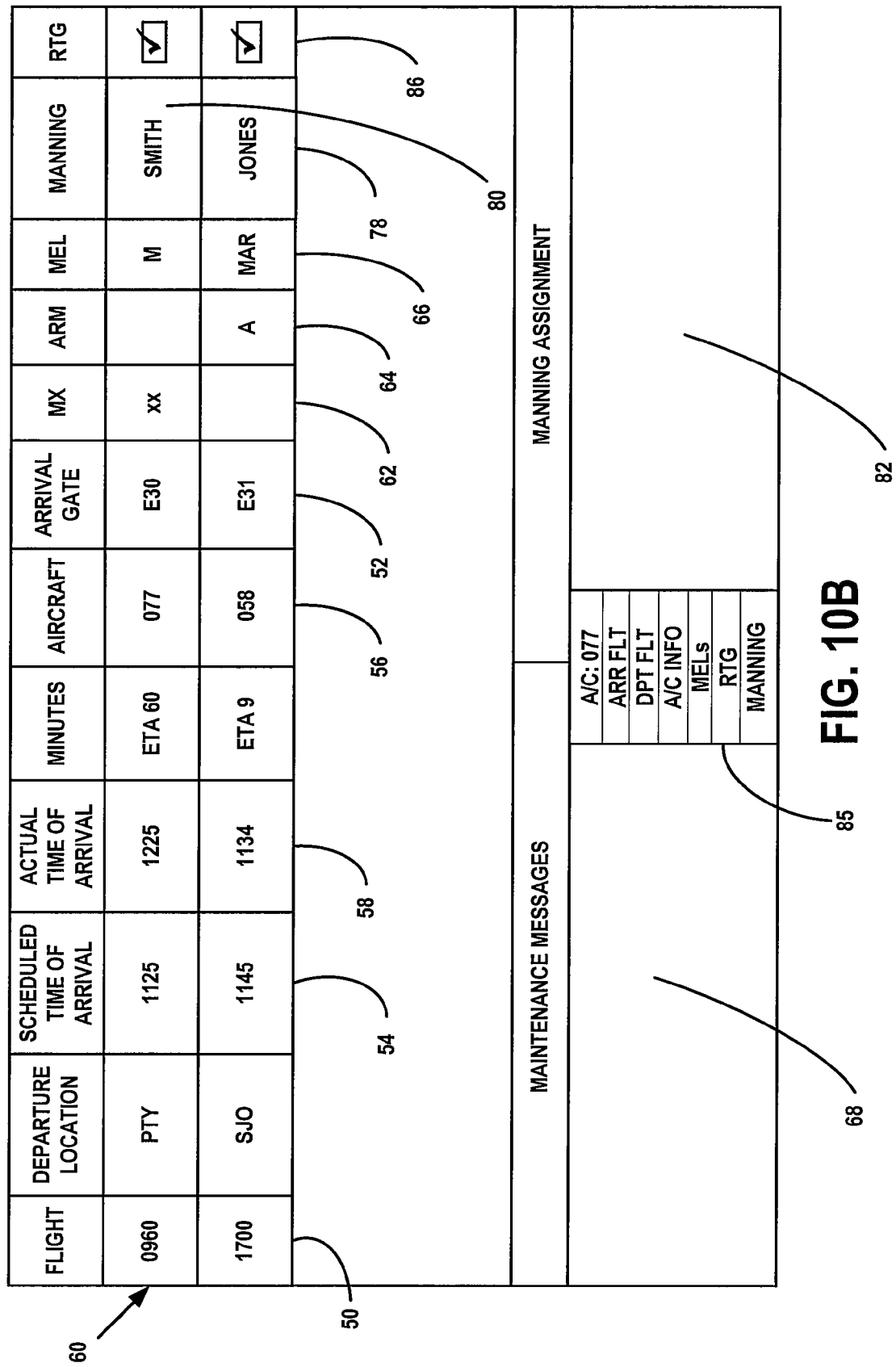
FIG. 10B is a diagrammatic illustration of still yet another portion of output generated during the method of FIG. 3, according to an exemplary embodiment.

In an exemplary embodiment, as illustrated in FIG. 10B with continuing reference to FIGS. 1A, 1B, 2, 3, 4, 5, 6, 7, 8, 9 and 10A, to display the confirmation of the completion of the maintenance activities in the step 46b, a checked box 86 under the header RTG, which stands for "Ready To Go," is automatically displayed in one or more rows in the plurality 60 of rows of parameters on each of the following: the output device 22c at the location of the crew chief office 20, the output devices 30ac and 30bc of the user interfaces 30a and 30b, respectively, at the respective locations at which the interfaces 30a and 30b are positioned, and the output devices 26a and 26b at the locations of the maintenance ready rooms 24a and 24b, respectively. For example, if the AMT 28a has confirmed completion of maintenance activities on the airplane 32a in accordance with the step 46a as described above, then the checked box 86 in the corresponding row in the plurality 60 of rows is automatically displayed to display the confirmation of the completion of the maintenance activities. As a result, the completion of the maintenance activities on the airplane is able to monitored from multiple locations including, for example, the crew chief office 20, the maintenance ready rooms 24a and 24b, and the respective locations of the mobile user interfaces 30a and 30b.

As a result of operating the system 10 by executing the method 36, the AMT 28a is able to meet the airplane 32a at the arrival gate 34a, perform maintenance activities including reviewing the logbook or maintenance record of the airplane 32a, and report back to the crew chief as to when the next flight employing the airplane 32a is ready for departure. Similarly, as a result of operating the system 10 by executing the method 36, the AMT 28b is able to meet the airplane 32b at the arrival gate 34b, perform maintenance activities including reviewing the logbook or maintenance record of the airplane 32b, and report back to the crew chief as to when the next flight employing the airplane 32b is ready for departure.

During the operation of the system 10 by the execution of the method 36, in an exemplary embodiment, as necessary and/or desired, the crew chief adjusts the assignment of maintenance resources made in the step 42 of the method 36 by changing the name and/or other identifier in the fields 70 and/or 72 (FIG. 6) in the plurality 48 of rows with the input device 22d at the location of the crew chief office 20. For example, the crew chief deletes the name "Smith" shown in FIG. 6 from the field 72 with the input device 22d, and inputs another name or identifier of another maintenance resource in the field 72 with the input device 22d, thereby adjusting the assignment of the maintenance resource to the aircraft identified by the aircraft identifier 56 and associated with the flight identified by the inbound flight identifier 50 displayed in the corresponding row in the plurality 48. In response to this adjustment of the maintenance resources in the plurality 48 of rows, the adjustment is automatically reflected in the plurality 60 of rows, that is, the adjusted assignments are indicated by the updated assignment identifiers 78 and 80, which are automatically displayed in the plurality 60 of rows.

Figure 11:
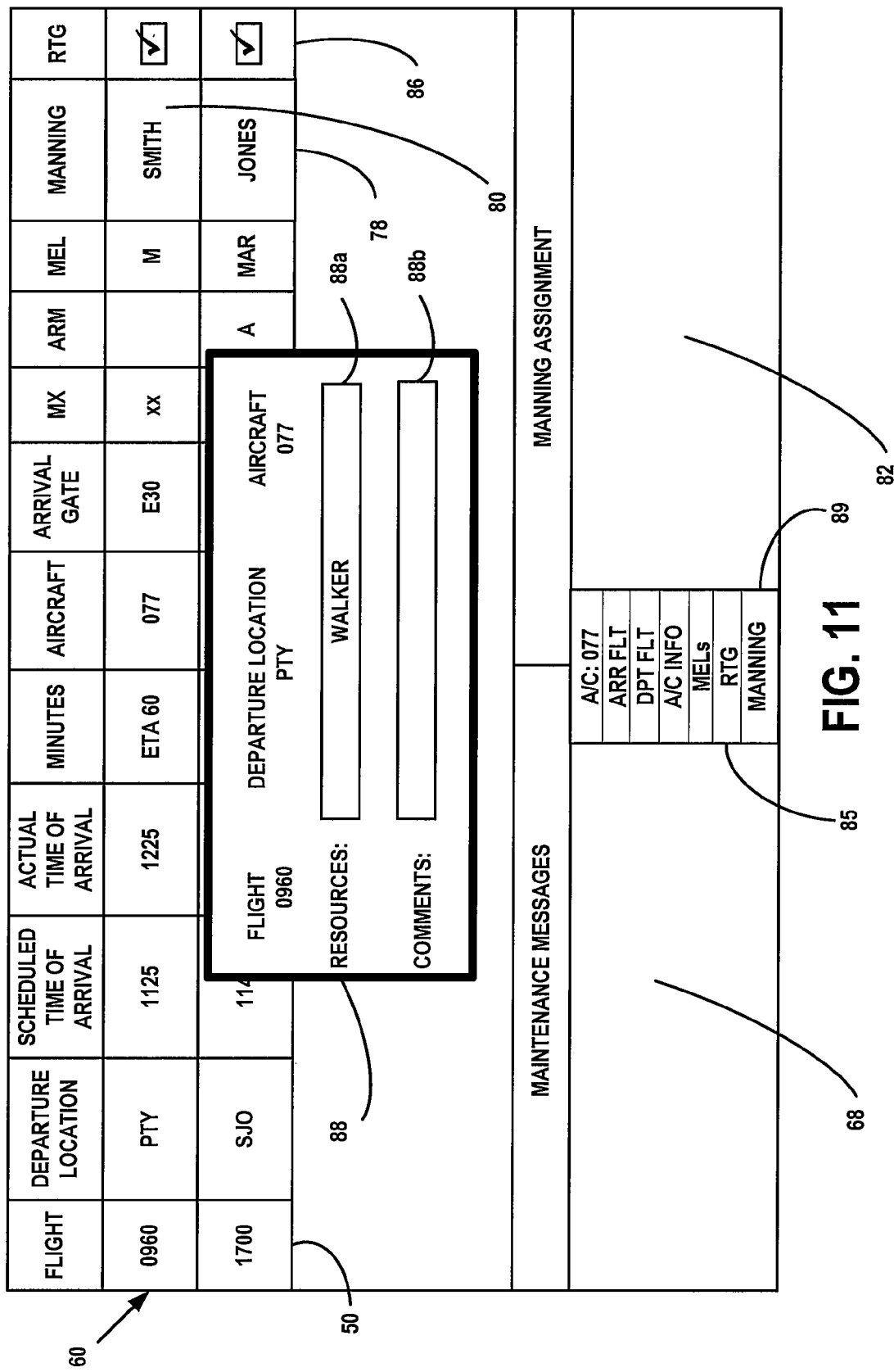
FIG. 11 is a diagrammatic illustration of still yet another portion of output generated during the method of FIG. 3, according to an exemplary embodiment.

In an exemplary embodiment, as illustrated in FIG. 11 with continuing reference to FIGS. 1A, 1B, 2, 3, 4, 5, 6, 7, 8, 9, 10A and 10B, instead of, or in addition to adjusting the assignment by changing the name and/or other identifier in the fields 70 and/or 72 in the plurality 48 of rows with the input device 22d at the location of the crew chief office 20, the assignment of maintenance resources made in the step 42 is adjusted, changed or updated by changing the assignment identifier 78 or 80 in the corresponding row in the plurality 60. In an exemplary embodiment, the crew chief opens a dialog box 88 on the output device 22c by, for example, clicking or otherwise selecting the header labeled MANNING and displayed on the output device 22c as shown in FIG. 11, clicking or otherwise selecting the row in the plurality 60 corresponding to the aircraft for which the assignment of maintenance resources are to be adjusted or updated, or highlighting the row in the plurality 60 corresponding to the aircraft for which the assignment of maintenance resources are to be adjusted and then clicking or otherwise selecting an icon or button 89 labeled MANNING. The dialog box 88 includes a field 88a in which the assignment of maintenance resources is adjusted with the input device 22d. Comments regarding the adjustment may be entered in a comments field 88b with the input device 22d. In an exemplary embodiment, the dialog box 88 further includes a link, the selection of which causes the plurality 48 of rows to be displayed.

In several exemplary embodiments, the adjustment of the maintenance resources is made based on the crew chief's judgment and discretion in view of his or her monitoring of, for example, the flight information, maintenance alerts and open maintenance items, which are being continually and automatically updated because the data received in the steps 38a and 40a is continually and automatically updated, continually and automatically updated at predetermined time intervals, and/or any combination thereof, thereby ensuring that the data received in the steps 38a and 40a remains current and accurate.

In an exemplary embodiment, instead of, or in addition to inputting the name and/or other identifier in the field 70 or 72 in the step 42, the initial assignments of maintenance resources made in the step 42 are made by, for each assignment, opening the dialog box 88 and inputting a name and/or other identifier in the field 88a of the dialog box 88 with the input device 22d.

In an exemplary embodiment, at, for example, the beginning of a maintenance shift, the maintenance resources are initially assigned in the step 42 arbitrarily by, for example, inputting the names of the AMTs 28a and 28b in the fields 70 and 72 alphabetically or in a round-robin format; however, during the maintenance shift, adjustments in the assignments are made as necessary and/or desired in view of, for example, updated flight information, updated maintenance alerts, updated open maintenance items, etc.

As a result of the adjustment of the assignment of the maintenance resources in either or both of the foregoing manners, the adjustment is displayed in the plurality 48 rows on the output device 22c of the user interface 22 at the location of the crew chief office 20, in the plurality 60 of rows of parameters displayed on the output device 22c of the user interface 22 at the location of the crew chief office 20, in the plurality 60 of rows of parameters displayed on the output devices 26a and 26b at the respective locations of the maintenance ready rooms 24a and 24b, in the plurality 60 of rows of parameters displayed on the output devices 30ac and 30bc at the respective locations of the user interfaces 30a and 30b, and/or any combination thereof, thereby permitting at least the crew chief and the AMTs 28a and 28b to monitor the adjustment from any of the crew chief office 20, the maintenance ready rooms 24a and 24b, and the respective locations of the user interfaces 30a and 30b. As a result, each of the crew chief and the AMTs 28a and 28b is aware of the assignment adjustment and can react accordingly.

Before, during and/or after the operation of the system 10 by the execution of the method 36, the data received during the method 36 including, for example, the data received in the steps 38a and 40a, the assignment data provided by the crew chief, the assignment adjustment data provided by the crew chief, and the ready-to-go, completion and/or comment data provided by the crew chief, the AMT 28*a* and/or the AMT 28*b*, is stored in one or more of the data center 12, the computer readable medium 16, the database 18, and the user interfaces 22, 30*a* and 30*b*. In several exemplary embodiments, this stored data is used for analytical, statistical, compliance, tracking and/or performance evaluation purposes.

In several exemplary embodiments, the operation of the system 10 by the execution of the method 36 integrates real-time flight information, manning assignment, and maintenance requirement functionality.

Moreover, in several exemplary embodiments, the pluralities 48 and/or 60 are displayed on the output device of any user interface located at the station of which the arrival gates 34*a* and 34*b* are a part, and/or on the output device of any user interface that is part of a network controlled by the airline operating the inbound flights employing the airplanes 32*a* and 32*b*; as a result, local, regional, national and international personnel of the airline are permitted to monitor the flight information and maintenance activities, including the maintenance requirements, the assignment of maintenance resources and the completion of maintenance activities, in connection with the inbound flights employing the airplanes 32*a* and 32*b*.

In several exemplary embodiments, the operation of the system 10 by the execution of the method 36 permits crew chiefs to assign AMTs to support inbound flights. During the execution of the method 36, crew chiefs can view flight information, maintenance alerts and open maintenance items in real-time while assigning resources, and AMTs can view the same information at locations other than the location at which the crew chief is positioned, such as different maintenance ready rooms. The execution of the method 36 allows for real-time changes and provides up-to-the-minute flight information and maintenance alerts.

In several exemplary embodiments, as a result of the operation of the system 10 by the execution of the method 36, a drastic reduction of short maintenance delays can be effected, with the reduction being due to the AMT receiving the maintenance assignment in real-time, assessing the maintenance needs before arrival and meeting the inbound flight at the arrival gate to review the logbook or maintenance record and perform necessary maintenance.

In several exemplary embodiments, as a result of the operation of the system 10 by the execution of the method 36, there is increased accountability in that maintenance assignments are visible to everyone at the station and past assignments are stored by the system 10; thus if a flight is delayed, local management can discuss issues with the people who were responsible for the delayed flight.

In several exemplary embodiments, each of the steps 38, 40, 42, 44 and 46 is executed before, during and/or after one or more of the other steps; in several exemplary embodiments, the steps 38, 40, 42, 44 and 46 are executed simultaneously, sequentially, and/or any combination thereof.

In several exemplary embodiments, at least a portion of the data received in, for example, the steps 38*a* and 40*a*, is received from one or more engines and/or modules disclosed in U.S. provisional patent application No. 61/143,075, the disclosure of which is incorporated herein by reference.

In several exemplary embodiments, each row in the plurality 48 of rows and the plurality 60 of rows includes corresponding departing flight information for the next flight employing the aircraft identified in the row, with the such departing flight information including, for example, the departing flight number, destination location, scheduled time of departure, actual time of departure, etc.

Figure 12:
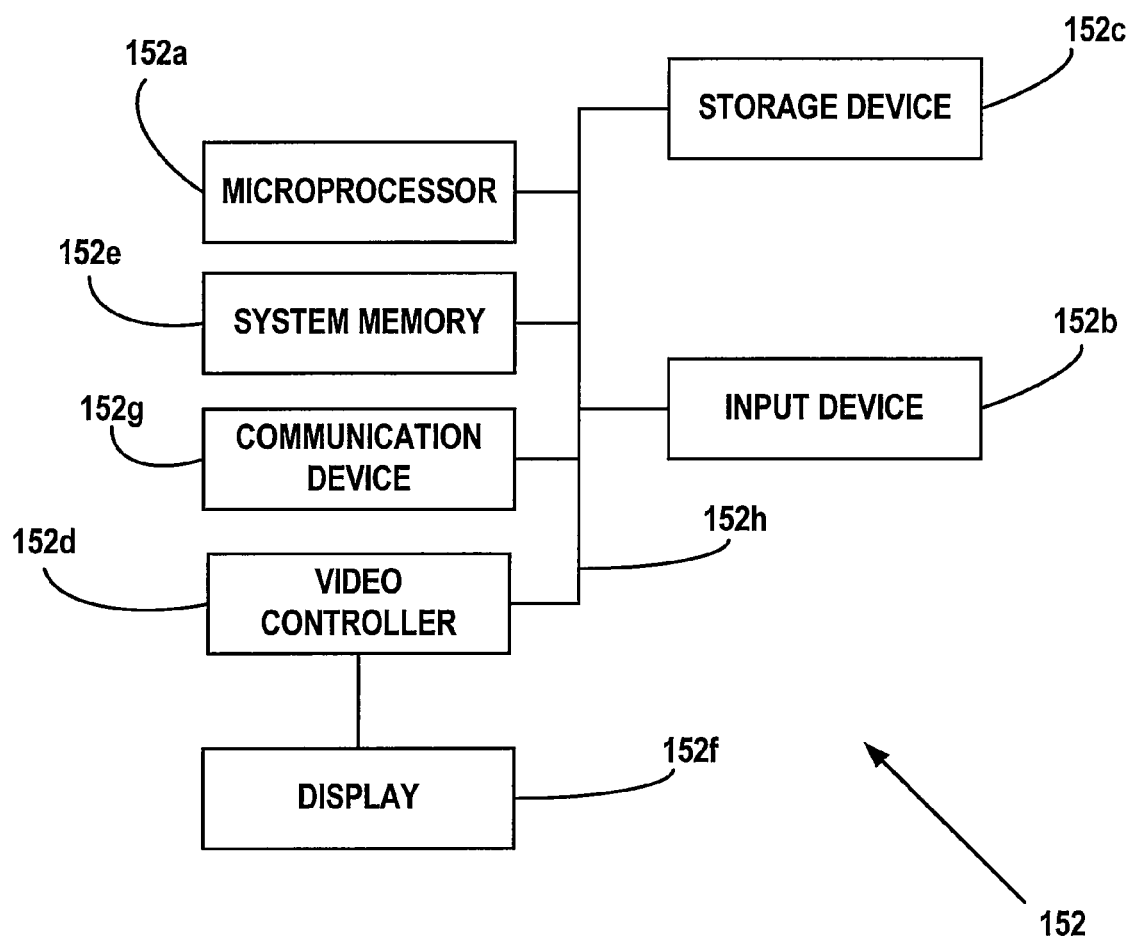
FIG. 12 is a diagrammatic illustration of a node for implementing one or more exemplary embodiments of the present disclosure, according to an exemplary embodiment.

In an exemplary embodiment, as illustrated in FIG. 12 with continuing reference to FIGS. 1A, 1B, 2, 3, 4, 5, 6, 7, 8, 9, 10A, 10B and 11, an illustrative node 90 for implementing one or more embodiments of one or more of the above-described networks, elements, methods and/or steps, and/or any combination thereof, is depicted. The node 90 includes a microprocessor 90*a*, an input device 90*b*, a storage device 90*c*, a video controller 90*d*, a system memory 90*e*, a display 90*f*, and a communication device 90*g* all interconnected by one or more buses 90*h*. In several exemplary embodiments, the storage device 90*c* may include a floppy drive, hard drive, CD-ROM, optical drive, any other form of storage device and/or any combination thereof. In several exemplary embodiments, the storage device 90*c* may include, and/or be capable of receiving, a floppy disk, CD-ROM, DVD-ROM, or any other form of computer-readable medium that may contain executable instructions. In several exemplary embodiments, the communication device 90*g* may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, one or more of the data center 12, the user interface 22, the output devices 26*a* and 26*b*, and the user interfaces 30*a* and 30*b*, is, or at least includes, the node 90 and/or components thereof, and/or one or more nodes that are substantially similar to the node 90 and/or components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 22, and/or one or more portions thereof, may be designed to work on any specific architecture. In an exemplary embodiment, one or more portions of the network 22 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

A method has been described that includes receiving data associated with an inbound airline flight from one or more data sources, the inbound airline flight employing an aircraft and having an arrival gate and a time of arrival at the arrival gate; at a first location, displaying on a first output device a plurality of parameters specific to the inbound airline flight in response to receiving data associated with the inbound airline flight, the plurality of parameters comprising an inbound flight identifier associated with the inbound flight; an arrival gate identifier associated with the arrival gate; a time of arrival indicator associated with the time of arrival; an aircraft identifier associated with the aircraft; and a maintenance indicator associated with at least one maintenance requirement of the aircraft; at the first location, assigning with a first input device a maintenance resource to the aircraft; at a second location, displaying on a second output device the following: the inbound flight identifier associated with the inbound flight; the arrival gate identifier associated with the arrival gate; the time of arrival indicator associated with the time of arrival; the aircraft identifier associated with the aircraft; the maintenance indicator associated with the at least one maintenance requirement of the aircraft; and an assignment identifier associated with the assignment of the maintenance resource to the aircraft; positioning the maintenance resource at the arrival gate at the same time as, or before, the time of arrival; at the arrival gate, performing one or more maintenance activities on the aircraft with the maintenance resource, comprising one or more of the following: comparing a maintenance record specific to the aircraft with the maintenance indicator displayed on the first output device at the first location and displayed on the second output device at the second location; and performing maintenance on the aircraft; at the first location, displaying on the first output device a completion identifier indicating the completion of performing the one or more maintenance activities on the aircraft; and at the second location, displaying on the second output device the completion identifier indicating the completion of performing the one or more maintenance activities on the aircraft. In an exemplary embodiment, the first location is a crew chief office; wherein the second location is a maintenance ready room; wherein the maintenance resource comprises an aircraft maintenance technician who is positioned in the maintenance ready room before being positioned at the arrival gate; and wherein performing maintenance on the aircraft comprises at least one of the following: performing maintenance on the aircraft in accordance with the at least one maintenance requirement; and performing maintenance on the aircraft not in accordance with the at least one maintenance requirement. In an exemplary embodiment, the method includes at the arrival gate, indicating with a second input device the completion of performing the one or more maintenance activities on the aircraft; wherein displaying on the first output device the completion identifier comprises displaying on the first output device the completion identifier in response to indicating with the second input device the completion of performing the one or more maintenance activities on the aircraft; and wherein displaying on the second output device the completion identifier comprises displaying on the second output device the completion identifier in response to indicating with the second input device the completion of performing the one or more maintenance activities on the aircraft. In an exemplary embodiment, receiving data associated with the inbound airline flight from the one or more data sources comprises receiving updated data associated with the inbound airline flight; wherein the parameters displayed on the first and second output devices are updated in response to receiving updated data associated with the inbound airline flight; and wherein the method further comprises adjusting with the first input device the assignment of the maintenance resource to the aircraft in response to receiving updated data associated with the inbound airline flight; at the first location, displaying on the first output device the adjustment of the assignment of the maintenance resource to the aircraft; and at the second location, displaying on the second output device the adjustment of the assignment of the maintenance resource to the aircraft. In an exemplary embodiment, the method includes storing the data associated with the inbound airline flight in a database; and storing data associated with the one or more maintenance activities in the database, the data associated with the one or more maintenance activities comprising data associated with the completion of the one or more maintenance activities. In an exemplary embodiment, the method includes receiving data associated with at least one other inbound airline flight from the one or more data sources, the at least one other inbound airline flight employing an aircraft and having an arrival gate and a time of arrival at the arrival gate; at the first location, displaying on the first output device a plurality of parameters specific to the at least one other inbound airline flight in response to receiving data associated with the at least one other inbound airline flight, the plurality of parameters comprising another inbound flight identifier associated with the at least one other inbound airline flight; another arrival gate identifier associated with the arrival gate of the at least one other inbound airline flight; another time of arrival indicator associated with the time of arrival of the at least one other inbound airline flight; another aircraft identifier associated with the aircraft of the at least one other inbound airline flight; and another maintenance indicator associated with at least one maintenance requirement of the aircraft of the at least one other inbound airline flight; at the first location, assigning with the first input device another maintenance resource to the aircraft of the at least one other inbound airline flight; and at the second location, displaying on the second output device the following: the another inbound flight identifier associated with the at least one other inbound airline flight; the another arrival gate identifier associated with the arrival gate of the at least one other inbound airline flight; the another time of arrival indicator associated with the time of arrival of the at least one other inbound airline flight; the another aircraft identifier associated with the aircraft of the at least one other inbound airline flight; and the another maintenance indicator associated with at least one maintenance requirement of the aircraft of the at least one other inbound airline flight. In an exemplary embodiment, receiving data associated with the first-mentioned inbound airline flight from the one or more data sources comprises receiving updated data associated with the first-mentioned inbound airline flight; wherein receiving data associated with the one or more other inbound airline flights from the one or more data sources comprises receiving updated data associated with the one or more other inbound airline flights; wherein the parameters displayed on the first and second output devices are updated in response to one or more of receiving the updated data associated with the first-mentioned inbound airline flight and receiving the updated data associated with the one or more other inbound airline flights; and wherein the method further comprises adjusting at least one of the assignments of the maintenance resources to the aircrafts in response to at least one of: receiving the updated data associated with the first-mentioned inbound airline flight, and receiving the updated data associated with the one or more other inbound airline flights; at the first location, displaying on the first output device the adjustment to the at least one of the assignments; and at the second location, displaying on the second output device the adjustment to the at least one of the assignments.

A system has been described that includes means for receiving data associated with an inbound airline flight from one or more data sources, the inbound airline flight employing an aircraft and having an arrival gate and a time of arrival at the arrival gate; means for at a first location, displaying on a first output device a plurality of parameters specific to the inbound airline flight in response to receiving data associated with the inbound airline flight, the plurality of parameters comprising an inbound flight identifier associated with the inbound flight; an arrival gate identifier associated with the arrival gate; a time of arrival indicator associated with the time of arrival; an aircraft identifier associated with the aircraft; and a maintenance indicator associated with at least one maintenance requirement of the aircraft; means for at the first location, assigning with a first input device a maintenance resource to the aircraft; means for at a second location, displaying on a second output device the following: the inbound flight identifier associated with the inbound flight; the arrival gate identifier associated with the arrival gate; the time of arrival indicator associated with the time of arrival; the aircraft identifier associated with the aircraft; the maintenance indicator associated with the at least one maintenance requirement of the aircraft; and an assignment identifier associated with the assignment of the maintenance resource to the aircraft; means for positioning the maintenance resource at the arrival gate at the same time as, or before, the time of arrival; means for at the arrival gate, performing one or more maintenance activities on the aircraft with the maintenance resource, comprising one or more of the following: means for comparing a maintenance record specific to the aircraft with the maintenance indicator displayed on the first output device at the first location and displayed on the second output device at the second location; and means for performing maintenance on the aircraft; means for at the first location, displaying on the first output device a completion identifier indicating the completion of performing the one or more maintenance activities on the aircraft; and means for at the second location, displaying on the second output device the completion identifier indicating the completion of performing the one or more maintenance activities on the aircraft. In an exemplary embodiment, the first location is a crew chief office; wherein the second location is a maintenance ready room; wherein the maintenance resource comprises an aircraft maintenance technician who is positioned in the maintenance ready room before being positioned at the arrival gate; and wherein means for performing maintenance on the aircraft comprises at least one of the following: means for performing maintenance on the aircraft in accordance with the at least one maintenance requirement; and means for performing maintenance on the aircraft not in accordance with the at least one maintenance requirement. In an exemplary embodiment, the system includes means for at the arrival gate, indicating with a second input device the completion of performing the one or more maintenance activities on the aircraft; wherein means for displaying on the first output device the completion identifier comprises means for displaying on the first output device the completion identifier in response to indicating with the second input device the completion of performing the one or more maintenance activities on the aircraft; and wherein means for displaying on the second output device the completion identifier comprises means for displaying on the second output device the completion identifier in response to indicating with the second input device the completion of performing the one or more maintenance activities on the aircraft. In an exemplary embodiment, means for receiving data associated with the inbound airline flight from the one or more data sources comprises means for receiving updated data associated with the inbound airline flight; wherein the parameters displayed on the first and second output devices are updated in response to receiving updated data associated with the inbound airline flight; and wherein the system further comprises means for adjusting with the first input device the assignment of the maintenance resource to the aircraft in response to receiving updated data associated with the inbound airline flight; means for at the first location, displaying on the first output device the adjustment of the assignment of the maintenance resource to the aircraft; and means for at the second location, displaying on the second output device the adjustment of the assignment of the maintenance resource to the aircraft. In an exemplary embodiment, the system includes means for storing the data associated with the inbound airline flight in a database; and means for storing data associated with the one or more maintenance activities in the database, the data associated with the one or more maintenance activities comprising data associated with the completion of the one or more maintenance activities. In an exemplary embodiment, the system includes means for receiving data associated with at least one other inbound airline flight from the one or more data sources, the at least one other inbound airline flight employing an aircraft and having an arrival gate and a time of arrival at the arrival gate; means for at the first location, displaying on the first output device a plurality of parameters specific to the at least one other inbound airline flight in response to receiving data associated with the at least one other inbound airline flight, the plurality of parameters comprising another inbound flight identifier associated with the at least one other inbound airline flight; another arrival gate identifier associated with the arrival gate of the at least one other inbound airline flight; another time of arrival indicator associated with the time of arrival of the at least one other inbound airline flight; another aircraft identifier associated with the aircraft of the at least one other inbound airline flight; and another maintenance indicator associated with at least one maintenance requirement of the aircraft of the at least one other inbound airline flight; means for at the first location, assigning with the first input device another maintenance resource to the aircraft of the at least one other inbound airline flight; and means for at the second location, displaying on the second output device the following: the another inbound flight identifier associated with the at least one other inbound airline flight; the another arrival gate identifier associated with the arrival gate of the at least one other inbound airline flight; the another time of arrival indicator associated with the time of arrival of the at least one other inbound airline flight; the another aircraft identifier associated with the aircraft of the at least one other inbound airline flight; and the another maintenance indicator associated with at least one maintenance requirement of the aircraft of the at least one other inbound airline flight. In an exemplary embodiment, means for receiving data associated with the first-mentioned inbound airline flight from the one or more data sources comprises means for receiving updated data associated with the first-mentioned inbound airline flight; wherein means for receiving data associated with the one or more other inbound airline flights from the one or more data sources comprises means for receiving updated data associated with the one or more other inbound airline flights; wherein the parameters displayed on the first and second output devices are updated in response to one or more of receiving the updated data associated with the first-mentioned inbound airline flight and receiving the updated data associated with the one or more other inbound airline flights; and wherein the system further comprises means for adjusting at least one of the assignments of the maintenance resources to the aircrafts in response to at least one of: receiving the updated data associated with the first-mentioned inbound airline flight, and receiving the updated data associated with the one or more other inbound airline flights; means for at the first location, displaying on the first output device the adjustment to the at least one of the assignments; and means for at the second location, displaying on the second output device the adjustment to the at least one of the assignments.

A system has been described that includes a computer readable medium comprising a plurality of instructions stored therein, the plurality of instructions comprising instructions for receiving data associated with an inbound airline flight from one or more data sources, the inbound airline flight employing an aircraft and having an arrival gate and a time of arrival at the arrival gate; instructions for at a first location, displaying on a first output device a plurality of parameters specific to the inbound airline flight in response to receiving data associated with the inbound airline flight, the plurality of parameters comprising an inbound flight identifier associated with the inbound flight; an arrival gate identifier associated with the arrival gate; a time of arrival indicator associated with the time of arrival; an aircraft identifier associated with the aircraft; and a maintenance indicator associated with at least one maintenance requirement of the aircraft; instructions for at the first location, assigning with a first input device a maintenance resource to the aircraft; instructions for at a second location, displaying on a second output device the following: the inbound flight identifier associated with the inbound flight; the arrival gate identifier associated with the arrival gate; the time of arrival indicator associated with the time of arrival; the aircraft identifier associated with the aircraft; the maintenance indicator associated with the at least one maintenance requirement of the aircraft; and an assignment identifier associated with the assignment of the maintenance resource to the aircraft; instructions for at the first location, displaying on the first output device a completion identifier indicating completion of performing one or more maintenance activities on the aircraft; and instructions for at the second location, displaying on the second output device the completion identifier indicating the completion of performing the one or more maintenance activities on the aircraft. In an exemplary embodiment, the system includes the arrival gate; wherein the maintenance resource is positioned at the arrival gate at the same time as, or before, the time of arrival; and wherein the one or more maintenance activities are performed on the aircraft with the maintenance resource at the arrival gate. In an exemplary embodiment, the system includes the first location, wherein the first location is a crew chief office; and the second location, wherein the second location is a maintenance ready room; wherein the maintenance resource comprises an aircraft maintenance technician who is positioned in the maintenance ready room before being positioned at the arrival gate. In an exemplary embodiment, the plurality of instructions further comprises instructions for at the arrival gate, indicating with a second input device the completion of performing the one or more maintenance activities on the aircraft; wherein instructions for displaying on the first output device the completion identifier comprises instructions for displaying on the first output device the completion identifier in response to indicating with the second input device the completion of performing the one or more maintenance activities on the aircraft; and wherein instructions for displaying on the second output device the completion identifier comprises instructions for displaying on the second output device the completion identifier in response to indicating with the second input device the completion of performing the one or more maintenance activities on the aircraft. In an exemplary embodiment, instructions for receiving data associated with the inbound airline flight from the one or more data sources comprises instructions for receiving updated data associated with the inbound airline flight; wherein the parameters displayed on the first and second output devices are updated in response to receiving updated data associated with the inbound airline flight; and wherein the plurality of instructions further comprises instructions for adjusting with the first input device the assignment of the maintenance resource to the aircraft in response to receiving updated data associated with the inbound airline flight; instructions for at the first location, displaying on the first output device the adjustment of the assignment of the maintenance resource to the aircraft; and instructions for at the second location, displaying on the second output device the adjustment of the assignment of the maintenance resource to the aircraft. In an exemplary embodiment, the plurality of instructions further comprises instructions for storing the data associated with the inbound airline flight in a database; and instructions for storing data associated with the one or more maintenance activities in the database, the data associated with the one or more maintenance activities comprising data associated with the completion of the one or more maintenance activities. In an exemplary embodiment, the plurality of instructions further comprises Instructions for receiving data associated with at least one other inbound airline flight from the one or more data sources, the at least one other inbound airline flight employing an aircraft and having an arrival gate and a time of arrival at the arrival gate; instructions for at the first location, displaying on the first output device a plurality of parameters specific to the at least one other inbound airline flight in response to receiving data associated with the at least one other inbound airline flight, the plurality of parameters comprising another inbound flight identifier associated with the at least one other inbound airline flight; another arrival gate identifier associated with the arrival gate of the at least one other inbound airline flight; another time of arrival indicator associated with the time of arrival of the at least one other inbound airline flight; another aircraft identifier associated with the aircraft of the at least one other inbound airline flight; and another maintenance indicator associated with at least one maintenance requirement of the aircraft of the at least one other inbound airline flight; instructions for at the first location, assigning with the first input device another maintenance resource to the aircraft of the at least one other inbound airline flight; and instructions for at the second location, displaying on the second output device the following: the another inbound flight identifier associated with the at least one other inbound airline flight; the another arrival gate identifier associated with the arrival gate of the at least one other inbound airline flight; the another time of arrival indicator associated with the time of arrival of the at least one other inbound airline flight; the another aircraft identifier associated with the aircraft of the at least one other inbound airline flight; and the another maintenance indicator associated with at least one maintenance requirement of the aircraft of the at least one other inbound airline flight. In an exemplary embodiment, instructions for receiving data associated with the first-mentioned inbound airline flight from the one or more data sources comprises instructions for receiving updated data associated with the first-mentioned inbound airline flight; wherein instructions for receiving data associated with the one or more other inbound airline flights from the one or more data sources comprises instructions for receiving updated data associated with the one or more other inbound airline flights; wherein the parameters displayed on the first and second output devices are updated in response to one or more of receiving the updated data associated with the first-mentioned inbound airline flight and receiving the updated data associated with the one or more other inbound airline flights; and wherein the plurality of instructions further comprises instructions for adjusting at least one of the assignments of the maintenance resources to the aircrafts in response to at least one of: receiving the updated data associated with the first-mentioned inbound airline flight, and receiving the updated data associated with the one or more other inbound airline flights; instructions for at the first location, displaying on the first output device the adjustment to the at least one of the assignments; and instructions for at the second location, displaying on the second output device the adjustment to the at least one of the assignments.

A method has been described that includes receiving data associated with a transportation transaction from one or more data sources, the transportation transaction employing a vehicle and having an arrival location and a time of arrival at the arrival location; at a first location, displaying on a first output device a plurality of parameters specific to the transportation transaction in response to receiving data associated with the transportation transaction, the plurality of parameters comprising a transaction identifier associated with the transaction; an arrival location identifier associated with the arrival location; a time of arrival indicator associated with the time of arrival; a vehicle identifier associated with the vehicle; and a maintenance indicator associated with at least one maintenance requirement of the vehicle; at the first location, assigning with a first input device a maintenance resource to the vehicle; at a second location, displaying on a second output device the following: the transaction identifier associated with the transaction; the arrival location identifier associated with the arrival location; the time of arrival indicator associated with the time of arrival; the vehicle identifier associated with the vehicle; the maintenance indicator associated with the at least one maintenance requirement of the vehicle; and an assignment identifier associated with the assignment of the maintenance resource to the vehicle; positioning the maintenance resource at the arrival location at the same time as, or before, the time of arrival; at the arrival location, performing one or more maintenance activities on the vehicle with the maintenance resource; at the first location, displaying on the first output device a completion identifier indicating the completion of performing the one or more maintenance activities on the vehicle; and at the second location, displaying on the second output device the completion identifier indicating the completion of performing the one or more maintenance activities on the vehicle. In an exemplary embodiment, the transportation transaction is an inbound airline flight, the vehicle is an aircraft, and the arrival location is an arrival gate.

A system has been described that includes means for receiving data associated with a transportation transaction from one or more data sources, the transportation transaction employing a vehicle and having an arrival location and a time of arrival at the arrival location; means for at a first location, displaying on a first output device a plurality of parameters specific to the transportation transaction in response to receiving data associated with the transportation transaction, the plurality of parameters comprising a transaction identifier associated with the transaction; an arrival location identifier associated with the arrival location; a time of arrival indicator associated with the time of arrival; a vehicle identifier associated with the vehicle; and a maintenance indicator associated with at least one maintenance requirement of the vehicle; means for at the first location, assigning with a first input device a maintenance resource to the vehicle; means for at a second location, displaying on a second output device the following: the transaction identifier associated with the transaction; the arrival location identifier associated with the arrival location; the time of arrival indicator associated with the time of arrival; the vehicle identifier associated with the vehicle; the maintenance indicator associated with the at least one maintenance requirement of the vehicle; and an assignment identifier associated with the assignment of the maintenance resource to the vehicle; means for positioning the maintenance resource at the arrival location at the same time as, or before, the time of arrival; means for at the arrival location, performing one or more maintenance activities on the vehicle with the maintenance resource; means for at the first location, displaying on the first output device a completion identifier indicating the completion of performing the one or more maintenance activities on the vehicle; and means for at the second location, displaying on the second output device the completion identifier indicating the completion of performing the one or more maintenance activities on the vehicle. In an exemplary embodiment, the transportation transaction is an inbound airline flight, the vehicle is an aircraft, and the arrival location is an arrival gate.

A system has been described that includes a computer readable medium comprising a plurality of instructions stored therein, the plurality of instructions comprising instructions for receiving data associated with a transportation transaction from one or more data sources, the transportation transaction employing a vehicle and having an arrival location and a time of arrival at the arrival location; instructions for at a first location, displaying on a first output device a plurality of parameters specific to the transportation transaction in response to receiving data associated with the transportation transaction, the plurality of parameters comprising a transaction identifier associated with the transaction; an arrival location identifier associated with the arrival location; a time of arrival indicator associated with the time of arrival; a vehicle identifier associated with the vehicle; and a maintenance indicator associated with at least one maintenance requirement of the vehicle; instructions for at the first location, assigning with a first input device a maintenance resource to the vehicle; instructions for at a second location, displaying on a second output device the following: the transaction identifier associated with the transaction; the arrival location identifier associated with the arrival location; the time of arrival indicator associated with the time of arrival; the vehicle identifier associated with the vehicle; the maintenance indicator associated with the at least one maintenance requirement of the vehicle; and an assignment identifier associated with the assignment of the maintenance resource to the vehicle; instructions for at the first location, displaying on the first output device a completion identifier indicating completion of performing one or more maintenance activities on the vehicle; and instructions for at the second location, displaying on the second output device the completion identifier indicating the completion of performing the one or more maintenance activities on the vehicle. In an exemplary embodiment, the transportation transaction is an inbound airline flight, the vehicle is an aircraft, and the arrival location is an arrival gate.

It is understood that variations may be made in the foregoing without departing from the scope of the disclosure. For example, instead of, or in addition to maintenance activities often conducted in the course of airline industry business, aspects of the present disclosure are applicable and/or readily adaptable to maintenance activities conducted in other industries, including rail, bus, cruise and other travel industries, shipping or delivery industries, rental car industries, hotels and other hospitality industries, entertainment industries, and other industries. In an exemplary embodiment, aspects of the present disclosure are readily applicable and/or readily adaptable to maintenance activities for maintaining ships arriving at, for example, a port. In an exemplary embodiment, aspects of the present disclosure are readily applicable and/or readily adaptable to maintenance activities for maintaining trucks arriving at, for example, a trucking or delivery distribution facility. In an exemplary embodiment, aspects of the present disclosure are readily applicable and/or readily adaptable to maintenance activities for maintaining trains arriving at, for example, a rail yard.

For another example, instead of, or in addition to transportation transactions often conducted in the course of airline industry business, aspects of the present disclosure are applicable and/or readily adaptable to transportation transactions conducted in other industries, including rail, bus, cruise and other travel industries, shipping or delivery industries, rental car industries, hotels and other hospitality industries, entertainment industries, and other industries. In an exemplary embodiment, aspects of the present disclosure are readily applicable and/or readily adaptable to a transportation transaction such as a shipping transaction during which one or more vehicles such as ships arrive at a port. In an exemplary embodiment, aspects of the present disclosure are readily applicable and/or readily adaptable to a transportation transaction such as a trucking transaction during which one or more vehicles such as trucks arrive at a central trucking or distribution facility. In an exemplary embodiment, aspects of the present disclosure are readily applicable and/or readily adaptable to a transportation transaction such as a rail transaction during which one or more vehicles such as trains arrive at a train station. In an exemplary embodiment, aspects of the present disclosure are applicable and/or readily adaptable to a wide variety of transportation transactions such as, for example, an airline sequence, a leg of an airline sequence, an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method comprising:

receiving data associated with an inbound airline flight from one or more data sources, the inbound airline flight employing an aircraft and having an arrival gate and a time of arrival at the arrival gate;

at a first location, displaying on a first output device a plurality of parameters specific to the inbound airline flight in response to receiving data associated with the inbound airline flight, the plurality of parameters comprising:
- an inbound flight identifier associated with the inbound flight;
- an arrival gate identifier associated with the arrival gate;
- a time of arrival indicator associated with the time of arrival;
- an aircraft identifier associated with the aircraft; and
- a maintenance indicator associated with at least one maintenance requirement of the aircraft;

at the first location, assigning with a first input device a maintenance resource to the aircraft;

at a second location, displaying on a second output device the following:
- the inbound flight identifier associated with the inbound flight;
- the arrival gate identifier associated with the arrival gate;
- the time of arrival indicator associated with the time of arrival;
- the aircraft identifier associated with the aircraft;
- the maintenance indicator associated with the at least one maintenance requirement of the aircraft; and
- an assignment identifier associated with the assignment of the maintenance resource to the aircraft;

positioning the maintenance resource at the arrival gate at the same time as, or before, the time of arrival;

at the arrival gate, performing one or more maintenance activities on the aircraft with the maintenance resource, comprising one or more of the following:
- comparing a maintenance record specific to the aircraft with the maintenance indicator displayed on the first output device at the first location and displayed on the second output device at the second location; and
- performing maintenance on the aircraft;

at the first location, displaying on the first output device a completion identifier indicating the completion of performing the one or more maintenance activities on the aircraft; and at the second location, displaying on the second output device the completion identifier indicating the completion of performing the one or more maintenance activities on the aircraft.

2. The method of claim 1 wherein the first location is a crew chief office;
wherein the second location is a maintenance ready room;
wherein the maintenance resource comprises an aircraft maintenance technician who is positioned in the maintenance ready room before being positioned at the arrival gate; and
wherein performing maintenance on the aircraft comprises at least one of the following:
- performing maintenance on the aircraft in accordance with the at least one maintenance requirement; and
- performing maintenance on the aircraft not in accordance with the at least one maintenance requirement.

3. The method of claim 1 further comprising:
at the arrival gate, indicating with a second input device the completion of performing the one or more maintenance activities on the aircraft;
wherein displaying on the first output device the completion identifier comprises:
- displaying on the first output device the completion identifier in response to indicating with the second input device the completion of performing the one or more maintenance activities on the aircraft; and
wherein displaying on the second output device the completion identifier comprises:
- displaying on the second output device the completion identifier in response to indicating with the second input device the completion of performing the one or more maintenance activities on the aircraft.

4. The method of claim 1 wherein receiving data associated with the inbound airline flight from the one or more data sources comprises:
receiving updated data associated with the inbound airline flight;
wherein the parameters displayed on the first and second output devices are updated in response to receiving updated data associated with the inbound airline flight; and
wherein the method further comprises:
- adjusting with the first input device the assignment of the maintenance resource to the aircraft in response to receiving updated data associated with the inbound airline flight;
- at the first location, displaying on the first output device the adjustment of the assignment of the maintenance resource to the aircraft; and
- at the second location, displaying on the second output device the adjustment of the assignment of the maintenance resource to the aircraft.

5. The method of claim 1 further comprising:
storing the data associated with the inbound airline flight in a database; and
storing data associated with the one or more maintenance activities in the database, the data associated with the one or more maintenance activities comprising data associated with the completion of the one or more maintenance activities.

6. The method of claim 1 further comprising:
receiving data associated with at least one other inbound airline flight from the one or more data sources, the at least one other inbound airline flight employing an aircraft and having an arrival gate and a time of arrival at the arrival gate;
at the first location, displaying on the first output device a plurality of parameters specific to the at least one other inbound airline flight in response to receiving data associated with the at least one other inbound airline flight, the plurality of parameters comprising:
- another inbound flight identifier associated with the at least one other inbound airline flight;
- another arrival gate identifier associated with the arrival gate of the at least one other inbound airline flight;
- another time of arrival indicator associated with the time of arrival of the at least one other inbound airline flight;
- another aircraft identifier associated with the aircraft of the at least one other inbound airline flight; and
- another maintenance indicator associated with at least one maintenance requirement of the aircraft of the at least one other inbound airline flight;

at the first location, assigning with the first input device another maintenance resource to the aircraft of the at least one other inbound airline flight; and
at the second location, displaying on the second output device the following:

the another inbound flight identifier associated with the at least one other inbound airline flight;

the another arrival gate identifier associated with the arrival gate of the at least one other inbound airline flight;

the another time of arrival indicator associated with the time of arrival of the at least one other inbound airline flight;

the another aircraft identifier associated with the aircraft of the at least one other inbound airline flight; and the another maintenance indicator associated with at least one maintenance requirement of the aircraft of the at least one other inbound airline flight.

7. The method of claim 6 wherein receiving data associated with the first-mentioned inbound airline flight from the one or more data sources comprises:

receiving updated data associated with the first-mentioned inbound airline flight;

wherein receiving data associated with the one or more other inbound airline flights from the one or more data sources comprises:

receiving updated data associated with the one or more other inbound airline flights;

wherein the parameters displayed on the first and second output devices are updated in response to one or more of receiving the updated data associated with the first-mentioned inbound airline flight and receiving the updated data associated with the one or more other inbound airline flights;

and wherein the method further comprises:

adjusting at least one of the assignments of the maintenance resources to the aircrafts in response to at least one of:

receiving the updated data associated with the first-mentioned inbound airline flight, and receiving the updated data associated with the one or more other inbound airline flights;

at the first location, displaying on the first output device the adjustment to the at least one of the assignments; and at the second location, displaying on the second output device the adjustment to the at least one of the assignments.

8. A system comprising:

means for receiving data associated with an inbound airline flight from one or more data sources, the inbound airline flight employing an aircraft and having an arrival gate and a time of arrival at the arrival gate;

means for at a first location, displaying on a first output device a plurality of parameters specific to the inbound airline flight in response to receiving data associated with the inbound airline flight, the plurality of parameters comprising:

an inbound flight identifier associated with the inbound flight;

an arrival gate identifier associated with the arrival gate;

a time of arrival indicator associated with the time of arrival;

an aircraft identifier associated with the aircraft; and a maintenance indicator associated with at least one maintenance requirement of the aircraft;

means for at the first location, assigning with a first input device a maintenance resource to the aircraft;

means for at a second location, displaying on a second output device the following:

the inbound flight identifier associated with the inbound flight;

the arrival gate identifier associated with the arrival gate;

the time of arrival indicator associated with the time of arrival;

the aircraft identifier associated with the aircraft;

the maintenance indicator associated with the at least one maintenance requirement of the aircraft; and an assignment identifier associated with the assignment of the maintenance resource to the aircraft;

means for positioning the maintenance resource at the arrival gate at the same time as, or before, the time of arrival;

means for at the arrival gate, performing one or more maintenance activities on the aircraft with the maintenance resource, comprising one or more of the following:

means for comparing a maintenance record specific to the aircraft with the maintenance indicator displayed on the first output device at the first location and displayed on the second output device at the second location;

and means for performing maintenance on the aircraft;

means for at the first location, displaying on the first output device a completion identifier indicating the completion of performing the one or more maintenance activities on the aircraft;

and means for at the second location, displaying on the second output device the completion identifier indicating the completion of performing the one or more maintenance activities on the aircraft.

9. The system of claim 8 wherein the first location is a crew chief office;

wherein the second location is a maintenance ready room;

wherein the maintenance resource comprises an aircraft maintenance technician who is positioned in the maintenance ready room before being positioned at the arrival gate; and wherein means for performing maintenance on the aircraft comprises at least one of the following:

means for performing maintenance on the aircraft in accordance with the at least one maintenance requirement; and means for performing maintenance on the aircraft not in accordance with the at least one maintenance requirement.

10. The system of claim 8 further comprising:

means for at the arrival gate, indicating with a second input device the completion of performing the one or more maintenance activities on the aircraft;

wherein means for displaying on the first output device the completion identifier comprises:

means for displaying on the first output device the completion identifier in response to indicating with the second input device the completion of performing the one or more maintenance activities on the aircraft; and wherein means for displaying on the second output device the completion identifier comprises:

means for displaying on the second output device the completion identifier in response to indicating with the second input device the completion of performing the one or more maintenance activities on the aircraft.

11. The system of claim 8 wherein means for receiving data associated with the inbound airline flight from the one or more data sources comprises:
- means for receiving updated data associated with the inbound airline flight;
- wherein the parameters displayed on the first and second output devices are updated in response to receiving updated data associated with the inbound airline flight; and
- wherein the system further comprises:
  - means for adjusting with the first input device the assignment of the maintenance resource to the aircraft in response to receiving updated data associated with the inbound airline flight;
  - means for at the first location, displaying on the first output device the adjustment of the assignment of the maintenance resource to the aircraft; and
  - means for at the second location, displaying on the second output device the adjustment of the assignment of the maintenance resource to the aircraft.

12. The system of claim 8 further comprising:
- means for storing the data associated with the inbound airline flight in a database; and
- means for storing data associated with the one or more maintenance activities in the database, the data associated with the one or more maintenance activities comprising data associated with the completion of the one or more maintenance activities.

13. The system of claim 8 further comprising:
- means for receiving data associated with at least one other inbound airline flight from the one or more data sources, the at least one other inbound airline flight employing an aircraft and having an arrival gate and a time of arrival at the arrival gate;
- means for at the first location, displaying on the first output device a plurality of parameters specific to the at least one other inbound airline flight in response to receiving data associated with the at least one other inbound airline flight, the plurality of parameters comprising:
  - another inbound flight identifier associated with the at least one other inbound airline flight;
  - another arrival gate identifier associated with the arrival gate of the at least one other inbound airline flight;
  - another time of arrival indicator associated with the time of arrival of the at least one other inbound airline flight;
  - another aircraft identifier associated with the aircraft of the at least one other inbound airline flight; and
  - another maintenance indicator associated with at least one maintenance requirement of the aircraft of the at least one other inbound airline flight;
- means for at the first location, assigning with the first input device another maintenance resource to the aircraft of the at least one other inbound airline flight; and
- means for at the second location, displaying on the second output device the following:
  - the another inbound flight identifier associated with the at least one other inbound airline flight;
  - the another arrival gate identifier associated with the arrival gate of the at least one other inbound airline flight;
  - the another time of arrival indicator associated with the time of arrival of the at least one other inbound airline flight;
  - the another aircraft identifier associated with the aircraft of the at least one other inbound airline flight; and
  - the another maintenance indicator associated with at least one maintenance requirement of the aircraft of the at least one other inbound airline flight.

14. The system of claim 13 wherein means for receiving data associated with the first-mentioned inbound airline flight from the one or more data sources comprises:
- means for receiving updated data associated with the first-mentioned inbound airline flight;
- wherein means for receiving data associated with the one or more other inbound airline flights from the one or more data sources comprises:
  - means for receiving updated data associated with the one or more other inbound airline flights;
- wherein the parameters displayed on the first and second output devices are updated in response to one or more of receiving the updated data associated with the first-mentioned inbound airline flight and receiving the updated data associated with the one or more other inbound airline flights;
and
- wherein the system further comprises:
  - means for adjusting at least one of the assignments of the maintenance resources to the aircrafts in response to at least one of:
    - receiving the updated data associated with the first-mentioned inbound airline flight, and
    - receiving the updated data associated with the one or more other inbound airline flights;
  - means for at the first location, displaying on the first output device the adjustment to the at least one of the assignments; and
  - means for at the second location, displaying on the second output device the adjustment to the at least one of the assignments.

15. A system comprising:
- a non-transitory computer readable medium comprising a plurality of instructions stored therein, the plurality of instructions comprising:
  - instructions for receiving data associated with an inbound airline flight from one or more data sources, the inbound airline flight employing an aircraft and having an arrival gate and a time of arrival at the arrival gate;
  - instructions for at a first location, displaying on a first output device a plurality of parameters specific to the inbound airline flight in response to receiving data associated with the inbound airline flight, the plurality of parameters comprising:
    - an inbound flight identifier associated with the inbound flight;
    - an arrival gate identifier associated with the arrival gate;
    - a time of arrival indicator associated with the time of arrival;
    - an aircraft identifier associated with the aircraft; and
    - a maintenance indicator associated with at least one maintenance requirement of the aircraft;
  - instructions for at the first location, assigning with a first input device a maintenance resource to the aircraft;
  - instructions for at a second location, displaying on a second output device the following:
    - the inbound flight identifier associated with the inbound flight;
    - the arrival gate identifier associated with the arrival gate;
    - the time of arrival indicator associated with the time of arrival;

the aircraft identifier associated with the aircraft;
the maintenance indicator associated with the at least one maintenance requirement of the aircraft; and
an assignment identifier associated with the assignment of the maintenance resource to the aircraft;
instructions for at the first location, displaying on the first output device a completion identifier indicating completion of performing one or more maintenance activities on the aircraft;
and
instructions for at the second location, displaying on the second output device the completion identifier indicating the completion of performing the one or more maintenance activities on the aircraft.

16. The system of claim 15 further comprising:
the arrival gate;
wherein the maintenance resource is positioned at the arrival gate at the same time as, or before, the time of arrival; and
wherein the one or more maintenance activities are performed on the aircraft with the maintenance resource at the arrival gate.

17. The system of claim 15 further comprising:
the first location, wherein the first location is a crew chief office; and
the second location, wherein the second location is a maintenance ready room;
wherein the maintenance resource comprises an aircraft maintenance technician who is positioned in the maintenance ready room before being positioned at the arrival gate.

18. The system of claim 15 wherein the plurality of instructions further comprises:
instructions for at the arrival gate, indicating with a second input device the completion of performing the one or more maintenance activities on the aircraft;
wherein instructions for displaying on the first output device the completion identifier comprises:
instructions for displaying on the first output device the completion identifier in response to indicating with the second input device the completion of performing the one or more maintenance activities on the aircraft; and
wherein instructions for displaying on the second output device the completion identifier comprises:
instructions for displaying on the second output device the completion identifier in response to indicating with the second input device the completion of performing the one or more maintenance activities on the aircraft.

19. The system of claim 15 wherein instructions for receiving data associated with the inbound airline flight from the one or more data sources comprises:
instructions for receiving updated data associated with the inbound airline flight;
wherein the parameters displayed on the first and second output devices are updated in response to receiving updated data associated with the inbound airline flight; and
wherein the plurality of instructions further comprises:
instructions for adjusting with the first input device the assignment of the maintenance resource to the aircraft in response to receiving updated data associated with the inbound airline flight;
instructions for at the first location, displaying on the first output device the adjustment of the assignment of the maintenance resource to the aircraft; and
instructions for at the second location, displaying on the second output device the adjustment of the assignment of the maintenance resource to the aircraft.

20. The system of claim 15 wherein the plurality of instructions further comprises:
instructions for storing the data associated with the inbound airline flight in a database; and
instructions for storing data associated with the one or more maintenance activities in the database, the data associated with the one or more maintenance activities comprising data associated with the completion of the one or more maintenance activities.

21. The system of claim 15 wherein the plurality of instructions further comprises:
instructions for receiving data associated with at least one other inbound airline flight from the one or more data sources, the at least one other inbound airline flight employing an aircraft and having an arrival gate and a time of arrival at the arrival gate;
instructions for at the first location, displaying on the first output device a plurality of parameters specific to the at least one other inbound airline flight in response to receiving data associated with the at least one other inbound airline flight, the plurality of parameters comprising:
another inbound flight identifier associated with the at least one other inbound airline flight;
another arrival gate identifier associated with the arrival gate of the at least one other inbound airline flight;
another time of arrival indicator associated with the time of arrival of the at least one other inbound airline flight;
another aircraft identifier associated with the aircraft of the at least one other inbound airline flight; and
another maintenance indicator associated with at least one maintenance requirement of the aircraft of the at least one other inbound airline flight;
instructions for at the first location, assigning with the first input device another maintenance resource to the aircraft of the at least one other inbound airline flight; and
instructions for at the second location, displaying on the second output device the following:
the another inbound flight identifier associated with the at least one other inbound airline flight;
the another arrival gate identifier associated with the arrival gate of the at least one other inbound airline flight;
the another time of arrival indicator associated with the time of arrival of the at least one other inbound airline flight;
the another aircraft identifier associated with the aircraft of the at least one other inbound airline flight; and
the another maintenance indicator associated with at least one maintenance requirement of the aircraft of the at least one other inbound airline flight.

22. The system of claim 21 wherein instructions for receiving data associated with the first-mentioned inbound airline flight from the one or more data sources comprises:
instructions for receiving updated data associated with the first-mentioned inbound airline flight;
wherein instructions for receiving data associated with the one or more other inbound airline flights from the one or more data sources comprises:
instructions for receiving updated data associated with the one or more other inbound airline flights;

wherein the parameters displayed on the first and second output devices are updated in response to one or more of receiving the updated data associated with the first-mentioned inbound airline flight and receiving the updated data associated with the one or more other inbound airline flights;
and
wherein the plurality of instructions further comprises:
   instructions for adjusting at least one of the assignments of the maintenance resources to the aircrafts in response to at least one of:
      receiving the updated data associated with the first-mentioned inbound airline flight, and
      receiving the updated data associated with the one or more other inbound airline flights;
   instructions for at the first location, displaying on the first output device the adjustment to the at least one of the assignments; and
   instructions for at the second location, displaying on the second output device the adjustment to the at least one of the assignments.

* * * * *